US008554816B2

(12) United States Patent
Olson

(10) Patent No.: US 8,554,816 B2
(45) Date of Patent: Oct. 8, 2013

(54) STATE FILTER

(75) Inventor: John V. Olson, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 418 days.

(21) Appl. No.: 12/869,342

(22) Filed: Aug. 26, 2010

(65) Prior Publication Data
US 2011/0173244 A1    Jul. 14, 2011

Related U.S. Application Data

(60) Provisional application No. 61/237,089, filed on Aug. 26, 2009.

(51) Int. Cl.
*G06F 17/10*    (2006.01)
(52) U.S. Cl.
USPC .......................................................... 708/308
(58) Field of Classification Search
USPC .................................. 708/300–323
See application file for complete search history.

(56) References Cited

U.S. PATENT DOCUMENTS

| | | | |
|---|---|---|---|
| 5,850,284 A | 12/1998 | Schoeffler et al. | 356/369 |
| 6,504,604 B1 | 1/2003 | Holland | 356/73.1 |
| 6,519,027 B1 | 2/2003 | Gordon et al. | 356/73.1 |
| 2007/0002321 A1 | 1/2007 | Desfonds et al. | 356/367 |
| 2008/0304061 A1 | 12/2008 | Ossikovski et al. | 356/301 |

OTHER PUBLICATIONS

PCT/US2010/046861 Dec. 3, 2010 International Search Report.
PCT/US2010/046861 Dec. 3, 2010 Written Opinion.

*Primary Examiner* — Tan V. Mai
(74) *Attorney, Agent, or Firm* — Ballard Spahr LLP

(57) ABSTRACT

Embodiments described herein describe the construction of frequency domain estimates of generalized power density and the filters that can be constructed from those estimates. Using the concept of the Stokes vector representation of the spectral matrix in an M-dimensional vector space, a generalization of the process in which the spectral matrix may be represented by a set of trace-orthogonal matrices that are based upon a particular signal state can be produced. One aspect of the process is as follows: given a particular signal, represented as by a state vector in the space, a complete, orthonormal set of vectors can be produced that includes the signal of interest. Then, a generalized set of matrices is constructed, based upon the developed vectors, that are trace-orthogonal and which serve as a basis set for the expansion of the spectral matrix. The coefficients of this expansion form a generalized Stokes vector that represents the power in the spectral matrix associated with the various state vectors. Filters that serve to extract or suppress information about a particular state may then be constructed using the components of the generalized Stokes vectors. The effectiveness of an embodiment this filter is demonstrated using acoustic data from a microphone array.

29 Claims, 11 Drawing Sheets

STATE FILTER

CROSS-REFERENCE TO RELATED APPLICATION

This application claims benefit of and priority to U.S. Provisional Patent Application Ser. No. 61/237,089 filed Aug. 26, 2009, which is incorporated by reference herein and made a part hereof.

GOVERNMENT SUPPORT CLAUSE

This invention was made with government support under contract number W9113M-08-C-0194 awarded by the U.S. Army Space and Missile Defense Command. The government has certain rights in the invention.

SUMMARY

Described herein are embodiments of systems, methods and computer program products for a state filter, which cleans digital signals in such a way that it at least partially resolves the cocktail party effect (i.e., the ability to focus one's listening attention on a single talker among a mixture of conversations and background noises, ignoring other conversations). Embodiments described herein eliminate dominant background noise and allow quieter signals underneath to be perceived.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
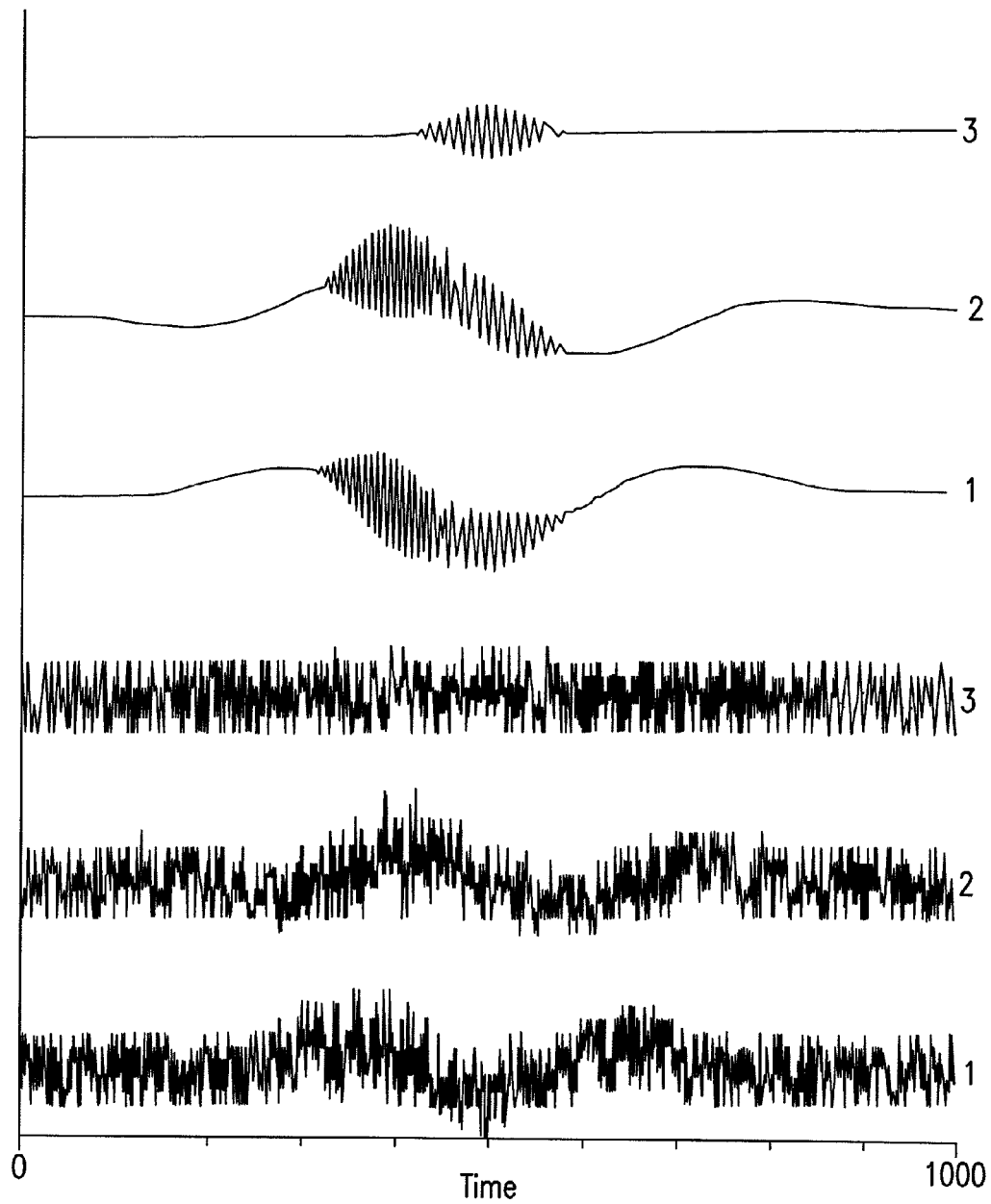
FIG. 1 shows a three component time series where top graphs (1), (2) and (3) are three pure states, bottom graphs (1), (2) and (3) are quantitized data of the time series plus uncorrelated noise, and the pure states are sinusoidal waves with cosine-bell amplitude modulation.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Generalized Stokes Vectors and Generalized Power Spectra for Second-Order Stationary Vector-Processes Introduction. In a paper written in 1930, Wiener (N. Weiner, *Generalized harmonic analysis*, Acta. Math., 55 (1930), pp. 117-258; incorporated herein by reference) introduced the concept of the coherency matrix of a set of second-order stationary process $x_j(t)(j=1,n)$. This set can be called a vector process the vector can be written as $x^T(t)=[x_1(t), x_2(t), \ldots, x_n(t)]$ where $$\Phi(u) = \langle (x(t)x^+(t+u) \rangle, \quad (1)$$

and $\langle \bullet \rangle$ denotes the expectation and $^+$ denotes the Hermitian adjoint. The spectral matrix can be defined as $$S(f_1, f_2) = \Gamma(f_2) - \Gamma(f_1), \quad (2)$$

where $$\Phi(u) = \int_{-\infty}^{\infty} \exp(2\pi i u f) \Gamma(df) \quad (3)$$

The matrix $S(f_1, f_2)$ is a nonnegative, Hermitian matrix in that for any vector u in a unitary space.

$$Tr(uu^+S) = a, \quad (4)$$

where a is a nonnegative real number and Tr is the trace. The matrix S is analogous to Wiener's coherency matrix.

Another important feature that Wiener showed was that the three Pauli spin matrices, plus the identity matrix, could be used as a basis for the algebra of the 2-square (n=2) coherency or spectral matrix. That is, $$S(n=2) = \quad (5)$$

$$2^{1/2}\sigma_1 \begin{pmatrix} 1 & 0 \\ 0 & 1 \end{pmatrix} + 2^{1/2}\sigma_2 \begin{pmatrix} 1 & 0 \\ 0 & -1 \end{pmatrix} + 2^{1/2}\sigma_3 \begin{pmatrix} 1 & 0 \\ 0 & 1 \end{pmatrix} + 2\frac{1}{2}\sigma \begin{pmatrix} 1 & i \\ -i & 0 \end{pmatrix}$$

Although Wiener may not have known it at the time, the expansion coefficients $\sigma_j$ (j=1,4) for this basis are directly connected with the four parameters which Stokes (G. G. Stokes, *On the composition and resolution of streams of polarized light from different sources*, Trans. Cambridge Phil. Soc., 9 (1852), pp. 399-412; incorporated herein by reference) introduced in 1852 in order to classify the polarization states of a light beam. This connection was pointed out by Fano (V. Fano, *A Stokes parameter technique for the treatment of polarization in quantum mechanics*, Phys. Rev., 93 (1954), pp. 121-123; incorporated herein by reference), who apparently was unaware of Wiener's 1930 publication. We shall call these expansion coefficients the Stokes parameters, and the ordered set of these parameters will be called the Stokes vectors.

The identity matrix plus the Pauli matrices are only one basis for the algebra of 2-square Hermitian matrices, and obviously, infinitely many bases can be constructed. The important features of this basis are that all the matrices are Hermitian, the matrices in the basis are trace-orthogonal, and the first matrix is proportional to the identity matrix. If the four matrices are $U_j$ (j=1,4) the trace-orthogonality condition indicates that $$Tr(U_k U_l) = \delta_{kl}, \quad (6)$$

and consequently for any arbitrary 2-square Hermitian matrix A, $$A = \sum_{j=1}^{4} \sigma_j U_j, \quad (7)$$

where $$\sigma_j = Tr(AU_j), \sigma_1 2^{-1/2}(A_{11} + A_{22}),$$

and the Stokes parameters $\sigma_j$ (j=1, n) are real numbers.

Described herein is a generalization of the Stokes parameters of second-order stationary, n-dimensional vector processes using arbitrary basis sets. For any dimension n, basis sets can be constructed from the outer products of any complete set of orthogonal vectors in an n-dimensional unitary space. The $n^2$ Stokes parameters allow a convenient representation of the information in the second-order stationary process in an $n^2$-dimensional Euclidean space. Also, the inner product defined in the space is operationally meaningful. The Stokes vectors lead naturally to the generalization of power spectra of n-dimensional processes, with the coordinate axis chosen as a direction in the $n^2$-dimensional Stokes vector space, rather than a direction in an n-dimensional real space. Some practical examples of time-series analysis are given in order to show some of the conceptual simplifications that result from the Stokes vector representation of the information.

a) The Generalized Orthogonality Condition.

Before continuing with the generation of basis sets for the expansion of Hermitian matrices, a generalized orthogonality relation for the bases needs to be defined. For vectors in a unitary space the orthogonality condition is $u^\dagger_j u_k = \delta_{jk}$ and a vector a can be expanded in the form $$a = \sum_{i=1}^{n} \sigma_i U_i \tag{9}$$

where $a_i = a^{554} u_i$.

The orthogonality condition can also be written as $$u_j^+ = Tr(u_k u_j^+) = \delta_{jk}. \tag{10}$$

The format in Equation (10) indicates that the orthogonality condition is given in terms of the complete contraction of the outer product $(u_j)^a (u_k)a^*$ where $(u_j)^a$ and $(u_k)_a$ are respectively the contravariant representation of $u_j$, and covariant representation of $u_k$. This observation leads directly to an orthogonality relation for tensors of arbitrary rank, and in particular tensors of rank two. We can write the orthogonality condition as the complete contraction of the outer product of one tensor and the Hermitian adjoint of the second. In matrix notation this can be written as $$Tr(U_j U_k^+) = \delta_{jk} \tag{11}$$

The simple basis sets $u_j u^\dagger_k$ (j=1,n; k=1,n; $u_k^+ = \delta_{jk}$) satisfy the orthogonality condition (11).

Since it is desired for the expansion coefficients $\sigma_j$ (j=1, $n^2$) to be real, basis sets are chosen to be Hermitian and the orthogonaltiy condition becomes $$Tr(U_j U_k) = \delta_{jk}. \tag{12}$$

A set of matrices $U_j$ (j=1, $n^2$) which satisfy condition (12) can be called a trace-orthogonal set. We note at this point that (12) is a necessary but not sufficient condition for the basis set to be Hermitian. The choice of Hermitian basis sets is extremely important, since it allows the information to be represented by a vector in an $n^2$-dimensional Euclidean space.

b) Construction of Basis Sets

The $n^2$ outer products of any n mutually orthonormal vectors in an n-dimensional unitary space can be used as a basis for the expansion of any n-square, complex matrix. In particular, for the spectral matrix S ($f_1, f_2$) we have (henceforth the dependence on $f_1$ and $f_2$ is implied)

$$S = \sum_{i=1}^{n} \sum_{k=1}^{n} a_{jk} u_j u_k^+ \tag{13}$$

where $u_j^+ u_k = \delta_{jk}$ and consequently $$Tr(u_j u_k^+ u_l u_m^+) = \delta_{kl} \delta_{jm}. \tag{14}$$

The complex coefficients $a_{jk}$ are then given by $$a_{jk} = Tr(u_k u_j^+ S). \tag{15}$$

The matrices $u_j u_k^+$ (j,k-1,n) are clearly not trace-orthogonal, but a trace-orthogonal set can be constructed by using the Hermitian outer products given by $$V_{(jk)}^{(+)} = (2+2\delta_{jk})^{-1/2}(u_j u_k^+ + u_k u_j^+)$$

$$V_{(jk)}^{(-)} = \delta_{jk} 2^{-1/2} i(u_j u_k^+ - u_k u_j^+) \tag{16}$$

In Eqs. (16), the subscripts (jk) indicate the matrix and not the components of the matrix. There are $(n^2+n)/2$ matrices $V^{(+)}$ and $(n^2-n)/2$ matrices $V^{(-)}$. For simplicity in notation the matrices can be labeled as $V_j$ (j=1,$n^2$) with $V_j$ (j=1, $((n^2+n)/2)$) corresponding $V^{(+)}$ (i.e., $V_1 = u_1 u_1^+$, $V_2 = u_2 u_2^+$, ...) and the remainder to $V^{(-)}$. It is easy to show that the set (16) is trace-orthogonal.

Having established the form of the basis set (16), any other basis set can be constructed from this set. The restriction that any basis set be Hermitian limits the allowable linear combination of the Vj's in forming the new basis. Before proceeding, the notation can be simplified by defining a vector with matrix components in the form $$\{u\}^T = [U_1, U_2, \ldots, U_{n^2}] \tag{17}$$

Then the following conventions will be used:
For any scalar a, $$a\{u\}^T = [aU_1, aU_2, \ldots, aU_{n^2}] \tag{18}$$

For any matrix A, $$A\{u\}^T = [AU_1, AU_2, \ldots, AU_{n^2}], \tag{19}$$

where AU represents matrix multiplication.
For any vector v, $$v^+\{u\} = \left[\sum_{j=1}^{n^2} r_j^* U_j\right] \tag{20}$$

For any vector $\{v\}$, $$\{v\}^T\{u\} = \sum_{j=1}^{n^2} V_j U_j$$

Finally, $$Tr\{v\} = r \tag{21}$$

where $r^T = [TrV_1, TrV_2, \ldots, TrV_{n^2}]$; and $$Tr(\{v\}\{u\}^T) = F, \tag{22}$$

where $F_{jk} = Tr(V_j V_k)$.

Suppose now, that a new basis $Z_k$ (k=1,$n^2$) is constructed from the set (16) by the linear combination $$Z_k = r_K^T \{v\}, \tag{23}$$

where $\{v\} = [V_1, V_2, \ldots, V_{n^2}]$. The trace-orthogonality condition (i.e., $Tr(Z_j Z_k) = \delta_{jk}$) gives $$Tr(\{z\}\{z\}^T) = Tr(R^T\{v\}\{v\}^T R), \tag{24}$$

Where R is the matrix of the column vectors $r_k$ ($k=1, n^2$). Since $Tr(\{v\}\{v\}^T) = I_n^2$, we have $$Tr(R^T\{v\}\{v^T\}R) = R^TR \text{ and } Tr(\{z\}\{z\}^T) = I_n^2 = R^TR. \quad (25)$$

Thus R must be an $n^2$-dimensional orthonormal rotation with real components.

To complete the analogy with the Stokes parameters for $n=2$, we must choose $Z=n^{-1/2}I_n$. In this case, the expansion becomes $$S = \sigma^T\{z\} \quad (26)$$

where $$\sigma = Tr(S\{z\}), \sigma_1 = n^{-1/2} TrS,$$

and $$\{z\}^T = [Z_1, Z_2, \ldots, Z_{n^2}].$$

We shall call the coefficients $\sigma_j$ ($j=1, n^2$)) the Stokes parameters. and the vector $\sigma$ the Stokes vector. Note that $\sigma$ is a vector in an $n^2$-dimensional Euclidean space.

To find a particular basis set for the Stokes parameters, we must find an orthonormal transformation R such that $$R\{v\} = \{z\}, \quad (27)$$

where $Z_1 = n^{-1/2}I_n^2$.

Inspection of the matrices $V^{[+]}$ and $V^{[-]}$ (16) indicates that $Tr(V^{[-]})=0$ and $Tr(V^{[+]})=\delta_{jk}$. Thus the $n^2-n$ matrices, $V_j$ ($j=n+1, n^2$) are already trace-orthogonal to $I_n$, whereas the n matrices $V_j = u_k u_j^+$ ($j=1,n$) are not. Since $$u_j^+ u_k = \delta_{jk}$$

$$\sum_{i=1}^n u_j u_j^+ = I_n,$$

$$r_1^T = n^{-1/2}[1,1 \ldots, 1, 0, \ldots, 0],$$

where the last $n^2-n$ coefficients are zero. Thus. we need to find $n-1$ vectors to complete our solution to (27). These can easily be found by following a Gram-Schmidt orthogonalization procedure. Often it is convenient to choose $$r_l^T = 2^{-\frac{1}{2}}[1, 0 \ldots, -1, 0, \ldots 0].$$

Consider, for example, the complete set of vectors $$u_1^T = 2^{-\frac{1}{2}}[1, i, 0], \quad u_2^T = 2^{-\frac{1}{2}}[1, -i, 0], \quad u_3^T = [0, 0, 1]. \quad (28)$$

Then we have:

$$V_1 = u_1 u_1^+ = \frac{1}{2}\begin{pmatrix} 1 & -i & 0 \\ i & 1 & 0 \\ 0 & 0 & 0 \end{pmatrix}, \quad (29)$$

$$V_2 = u_2 u_2^+ = \frac{1}{2}\begin{pmatrix} 1 & i & 0 \\ -i & 1 & 0 \\ 0 & 0 & 0 \end{pmatrix},$$

-continued $$V_3 = u_3 u_3^+ = \frac{1}{2}\begin{pmatrix} 0 & 0 & 0 \\ 0 & 0 & 0 \\ 0 & 0 & 1 \end{pmatrix},$$

$$V_4 = 2^{-1/2}(u_1 u_2^+ + u_2 u_1^+) = 2^{-1/2}\begin{pmatrix} 1 & 0 & 0 \\ 0 & -1 & 0 \\ 0 & 0 & 0 \end{pmatrix},$$

$$V_5 = 2^{-1/2}(u_1 u_3^+ + u_3 u_1^+) = \frac{1}{2}\begin{pmatrix} 0 & 0 & 0 \\ 0 & 0 & i \\ 1 & -i & 0 \end{pmatrix},$$

$$V_6 = 2^{-1/2}(u_2 u_3^+ + u_3 u_2^+) = \frac{1}{2}\begin{pmatrix} 0 & 0 & 1 \\ 0 & 0 & -i \\ 1 & i & 0 \end{pmatrix},$$

$$V_7 = 2^{-1/2}(u_1 u_3^+ - u_3 u_1^+) = \frac{1}{2}\begin{pmatrix} 0 & -1 & 0 \\ -1 & 0 & 0 \\ 0 & 0 & 0 \end{pmatrix},$$

$$V_8 = 2^{-1/2}(u_1 u_3^+ - u_3 u_1^+) = \frac{1}{2}\begin{pmatrix} 0 & 0 & i \\ 0 & 0 & -1 \\ -i & -1 & 0 \end{pmatrix},$$

$$V_9 = 2^{-1/2}(u_2 u_3^+ - u_3 u_2^+) = \frac{1}{2}\begin{pmatrix} 0 & 0 & i \\ 0 & 0 & 1 \\ -i & 1 & 0 \end{pmatrix},$$

The basis set for the Stokes parameters is $$Z_1 = r_1^T\{v\} = 3^{-1/2}[1, 1, 1, 0, \ldots, 0]\{v\} \quad (30)$$

$$= 3^{-1/2}\begin{pmatrix} 1 & 0 & 0 \\ 0 & 1 & 0 \\ 0 & 0 & 1 \end{pmatrix},$$

$$Z_2 = r_2^T\{v\} = 2^{-1/2}[1, 0, -1, 0, \ldots, 0]\{v\}$$

$$= 2^{-3/2}\begin{pmatrix} 1 & -i & 0 \\ i & 1 & 0 \\ 0 & 0 & -2 \end{pmatrix},$$

$$Z_3 = r_3^T\{v\} = 6^{-1/2}[1, -2, 1, 0, \ldots, 0]\{v\}$$

$$= 24^{-1/2}\begin{pmatrix} -1 & -3i & 0 \\ 3i & -1 & 0 \\ 0 & 0 & 0 \end{pmatrix},$$

and $Z_l = V_l (l = 4, 9)$.

c) Generalized Stokes Vectors and Generalized Power Spectra

We shall call the space occupied by all possible Stokes vectors $\sigma = Tr(S\{z\})$, the Stokes vector space. The nonnegative condition for S will be discussed later, but here we wish to show that the inner-product relation in the Stokes vector space has an operational significance. We begin by considering the concept of power spectra in a real space. In an n-dimensional Euclidean space, the power spectrum $D(f_1, f_2)$ in the direction r is given by $$D(f_2, f_2) = r^T S(f_1, f_2) r = Tr(rr^T S(f_1, f_s)) \quad (31)$$

Equation (31) can be generalized for a unitary space giving $$D(f_1, f_2) = Tr(uu^+ S(f_1, f_2)) \quad (32)$$

where u is a vector in a unitary space.

If we determine the Stokes vectors $$\sigma(f_1,f_2)=Tr(S(f_1,f_2)\{z\}) \qquad (33)$$

and $$\sigma=Tr(uu^+\{z\}) \qquad (34)$$

then the power is given by $$D(f_1, f_2) = \sum_{j=1}^{n^2} \sum_{k=1}^{n^2} (\sigma_1 \rho_k(Z_1 Z_k)) \qquad (35)$$
$$= \sum_{j=1}^{n^2} \sigma_1 \rho_i$$

Thus, in vector notation we can write D as the inner product $$D(f_1,f_2))=\rho^T\sigma(f_1,f_2) \qquad (36)$$

We shall call the inner product in (36) the generalized power spectrum in the direction ρ. We can further generalize this concept by constructing ρ from any nonnegative Hermitian matrix H, where in general H has more than one nonzero eigenvalue. That is, $$\rho=(TrH^2)^{1/2}Tr(H\{z\}) \qquad (37)$$

d) The Nonnegative Condition and Pure States

In the introduction, we pointed out that the spectral matrix S is nonnegative. The nonnegative restriction limits the region that the vectors σ can occupy in the $n^2$-dimensional Euclidean space. We shall call this subspace the Stokes vector space. If we consider the characteristic polynomial ψ of S given by $$\Psi = \sum_{l=0}^{n} (-1)^{(n-l)} a_l \lambda^l \qquad (38)$$

then the nonnegative condition becomes $$a_l \geq 0, (l=0,n-1) \qquad (39)$$

In terms of the n scalar invariants Tr(S') (1=1,n), the first few coefficients are $$a_n = 1.0, \qquad (40)$$
$$a_{n-1} = TrS,$$
$$a_{n-2} = \frac{1}{2}([TrS]^2 - (TrS^2)],$$
$$a_{n-3} = n^{-1}\left[(TrS^3) - \frac{3}{2}(TrS)(TrS^2) + \frac{1}{2}(TrS)^3\right],$$

and $a_o = \det S$ for all $n$.

In terms of the Stokes vectors the first two nonnegative conditions are $$n^{-1/2} a_{n-1} = \sigma_1 \geq 0, \qquad (41)$$

$$2a_{n-2} = n\sigma_1^2 - \sigma^T\sigma \geq 0. \qquad (42)$$

Equation (41) indicates that the vectors can occupy only the halfspace where $\sigma_1 \geq 0$. Equation (42) can be rewritten $$n\sigma_1^T\sigma_1=n\sigma_1^T\sigma \geq \sigma^T\sigma \qquad (43)$$

where $\sigma_1^T=[\sigma_1,0,\ldots,0]$ Multiplying both sides by $\sigma_1^T\sigma_1$ and taking the square root we find $$\sigma^T\sigma_1/[(\sigma^T\sigma)^{1/2}(\sigma_1^T\sigma_1)^{1/2}] \geq n^{-1/2}. \qquad (44)$$

Equation (44) indicates that the Stokes vectors are restricted to a cone with an axis $\sigma_1$, and the angle $\theta_0$ between $\sigma_1$ and the side of the cone is given by $$\theta_0=\cos^{-1}(n^{-1/2}). \qquad (45)$$

For n=2, relations (41) and (42) are the only two nonnegative conditions, and the Stokes vectors can occupy any region inside the cone. If n>2, we must also consider the conditions $a_{n-l}(l>2) \geq 0$ and these conditions will limit the region of the cone that can be occupied.

If $\theta=\cos^{-1}(n^{-1/2})$, then an $a_{n-2}=0$ and S has only nonzero eigenvalue. Consequently, S can be written in the form $$S=\lambda=\lambda uu^+, \qquad (46)$$

where λ is the nonzero eigenvalue and u is the associated eigenvector. In this case, we shall say that S is a pure state, or purely polarized, with the associated state vector $\lambda^{1/2}u$ and Stokes vector $$\sigma=\lambda Tr(uu^+\{z\}). \qquad (47)$$

The configuration of the Stokes vector space suggests a very simple measure of the purity or degree of polarization of the process. If the process is purely unpolarized, the Stokes vector will be in the direction, $\sigma_1$ and $$\sigma^T\sigma_1-\sigma^T\sigma=0 \qquad (48)$$

If the process is a pure state the Stokes vector will lie on the surface of the cone and $$n\sigma^T\sigma_1-\sigma^T\sigma=0. \qquad (49)$$

Thus, we have $$\sigma^T\sigma_1 \leq \sigma^T\sigma \leq n\sigma^T\sigma_1, \text{ or}$$

$$0 \leq \sigma^T\sigma-\sigma^T\sigma_1 \leq (n-1)\sigma^T\sigma_1. \qquad (50)$$

Dividing by $(n-1)\sigma^T\sigma_1$, we define the degree of polarization P by $$P^2=(\sigma^T\sigma-\sigma^T\sigma_1)/[(n-1)\sigma^T\sigma_1], 0 \leq P \leq 1. \qquad (51)$$

The degree of polarization P can also be written in terms of the eigenvalues of S by noting that $$\sigma^T\sigma = Tr(S^2) = \sum_{j=1}^{n} \lambda_j^2, \text{ and } \sigma^T\sigma_1 = \frac{1}{n}(TrS)^2 = \frac{1}{n}\left(\sum_{j=1}^{n} \lambda_j\right)^2. \qquad (52)$$

After some manipulation, P can then be written in the form $$P^2 = \frac{1}{2(n-1)(TrS)^2} \sum_{j,k=1}^{n} (\lambda_j - \lambda_k)^2. \qquad (53)$$

In particular, for n=2 we have $$P^2=(\lambda_1-\lambda_2)^2/(\lambda_1+\lambda_2)^2. \qquad (54)$$

This is the same parameter as that used by Born and Wolf (M. Born and E. Wolf, *Principles of Optics*, Pergamon Press, New York, 1959; incorporated herein by reference) to describe the degree of polarization of photons (n=2).

e) Some Examples

To illustrate the use of the Stokes vector representation of the information, we have chosen a computer generated, three-dimensional time series consisting of three superimposed pure states and unpolarized random noise (FIG. 1). FIG. 1 shows a three component time series. Top graphs (1), (2) and (3) are three pure states. Bottom graphs (1), (2) and (3) are quantitized data of the time series plus uncorrelated noise. The pure states are sinusoidal waves with cosine-bell amplitude modulation. The state vectors, frequency and intervals for the waves are $$i\ u_a{}^T = [1, -i, 0], f_a = 0.05, 0 \leq t \leq 1000;$$

$$u_b{}^T = [0.65, -0.65, 0.42] + i[0.5, 0.0, 0.65] f_b = 0.1, 400 \leq t \leq 600;$$

$$u_c{}^T = [1,1,0], f_c = 0.15, 300 \leq t \leq 500$$

The three pure states are plotted at the top of FIG. 1, and the pure states plus random noise are plotted at the bottom of FIG. 1. The noisy data, which will be used in the analysis, have also been quantized with approximately 10 quantizing intervals over the peak-to-peak range of the time series.

In this example, we shall assume that the wave (b) is to be detected by using a simple "yes-no" decision. As an acceptance criterion, we shall use, as a first approximation, the angle between the Stokes vector of the desired wave and the Stokes vector of the three-dimensional time series. As we shall see, this simple acceptance criterion is adequate, even with such coarsely quantized data.

Before continuing, a cautionary comment should be made about the estimates of the Stokes vectors and the parameters computed from the Stokes vectors. If no smoothing of the spectral estimates is used (degrees of freedom $v=1$ for complex Wishart distribution), then all the Stokes vectors will lie on the surface of the cone. If we assume that the time series are essentially uncorrelated random noise sequences of equal power, then as $v$ increases, the distribution of vectors will become more uniformly spread throughout the interior of the cone. As $v \to \infty$ all the vectors will cluster along the axis of the cone. Similarly, the estimated degree of polarization ($P_E$) (subscript E indicates an estimate) will have zero variance, and ($P_E$)=1.0 when $v=1$. As $v$ increases, ($P_E$) decreases and the variance increases to a maximum for some value of $v$. When $p \to \infty$, ($P_E$)=0.0 (assuming unpolarized random noise) and the variance is also zero.

Similar caution must be exercised in interpreting the inner products $\sigma^T \sigma_E$, where $\sigma$ is the Stokes vector of the desired wave and $\sigma_E$ is the Stokes vector estimated from the time series. If $\sigma$ represents a pure state, then $(\sigma^T \sigma_E / \sigma \sigma_E) = 1/n$ for all $v$ (random noise time series), although the variance is a maximum for $v=1$ and decreases monotonically as $v$ increases. If $\sigma$ s a purely unpolarized state, then $(\sigma^T \sigma_E / \sigma \sigma_E) = n^{-1/2}$ and the variance is zero when $v=1$. As $v$ increases, $(\sigma^T \sigma_E / \sigma \sigma_E)$ decreases monotonically toward zero and the variance reaches a maximum for some value of $v$ and then decreases to zero as $v \to \infty$. No attempt has been made to give a rigorous evaluation of the distributions of the estimators in the following examples.

In computing the estimates for the diagrams, a time-domain window 100 samples long was used. The spectral window had 6 degrees of freedom (complex Wishart) with a corresponding bandwidth of about 0.1.

Figure 2:
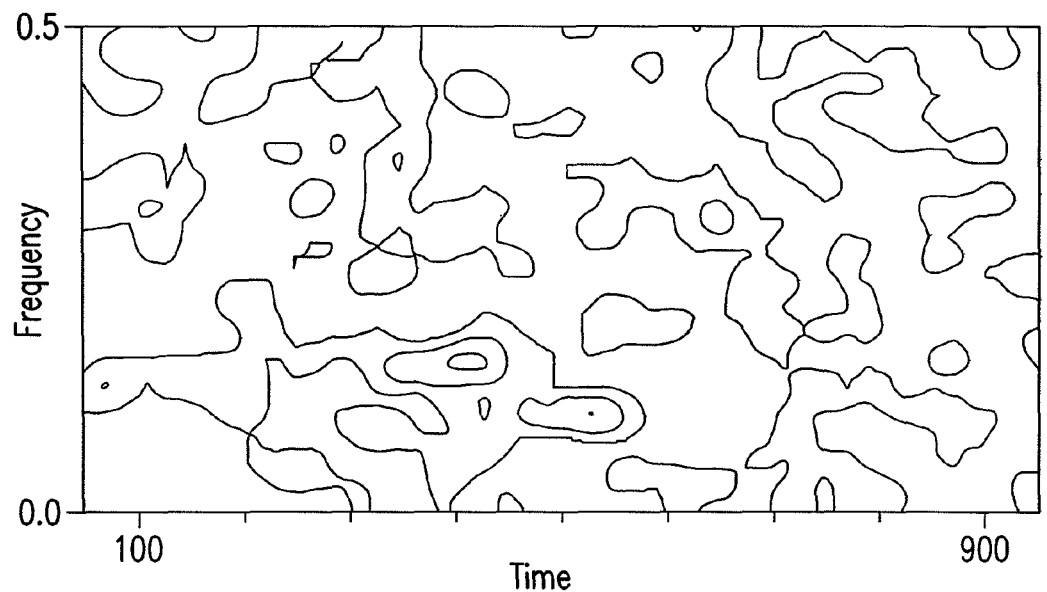
FIG. 2 is a contour plot that shows the contours of $T_r S_E$ as a function of frequency and time.

FIG. 2 is a contour plot that shows the contours of $T_r S_E$ as a function of frequency and time. Contour values are 2.0, 1.0 and 0.5 (arbitrary units). The shaded areas are greater than 2.0. The spectral window has six degrees of freedom (complex Wishart). The contour plot in FIG. 2 gives the value of $(\sigma_1)_E = n^{-1/2} Tr S_E$ as a function of frequency and time. The wave we wish detect is the one occurring between 400-600 with frequency 0.1. The contour plot indicates that there is a local maximum near the region where we expect the wave to be, although the peak is barely discernible. The wave train occurring between 300-500 is more clearly resolved.

Figure 3:
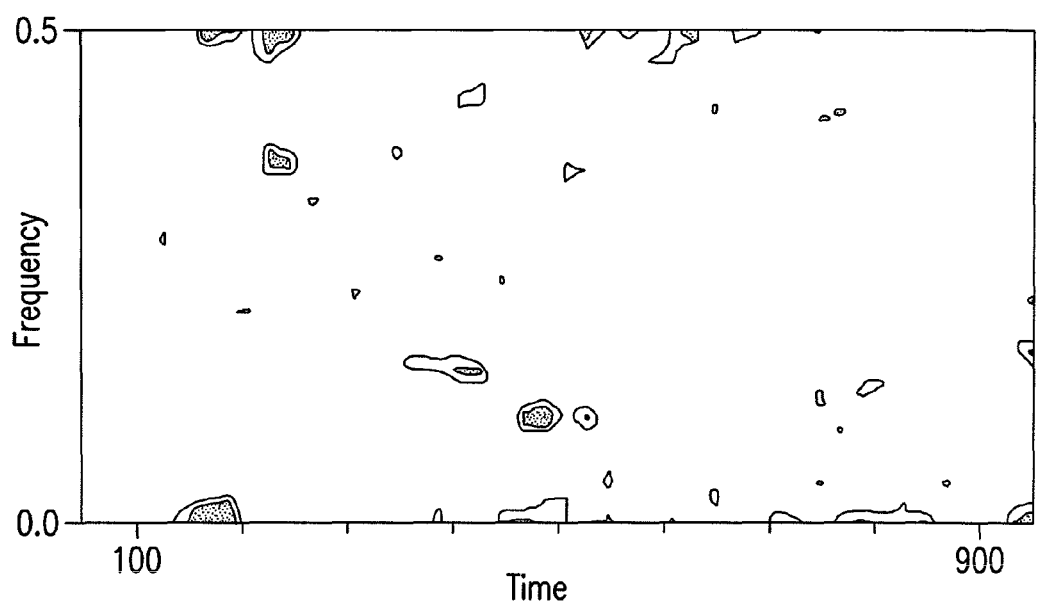
FIG. 3 is a contour plot showing contours of the degree of polarization ($P^2$ in Eq. 51) where the contour values are 0.95 and 0.9, and the dark areas are greater than 0.95.

FIG. 3 is a contour plot showing contours of the degree of polarization ($P^2$ in Eq. 51) where the contour values are 0.95 and 0.9, and the dark areas are greater than 0.95. The degree of polarization ($P_E$) is plotted as a function of frequency and time in FIG. 3. Although the two wave trains show high polarization on the plot there are a number of other maxima which make the identification of the wave trains rather dubious.

To compute the Stokes vectors for the example, we have constructed the basis set using the vectors $u_1{}^T = [1, 0, 0]$, $u_2{}^T = [0, 1, 0]$, $u_3{}^T = [0, 0, 1)$, and the vectors $r_j$ (j=1,n$^2$) from (30). In terms of the components of the matrix $S_E$, the Stokes parameters are $$\sigma_{1E} = 3^{-1/2} Tr S_E$$

$$\sigma_{2E} = 2^{-1/2}(S_{11E} - S_{33E})$$

$$\sigma_{3E} = 6^{-1/2}(S_{11E} - 2S_{22E} + S_{33E})$$

$$\sigma_{4E} = 2^{-3/2} Re S_{12E}$$

$$\sigma_{5E} = 2^{-3/2} Re S_{13E}$$

$$\sigma_{6E} = 2^{-3/2} Im S_{23E}$$

$$\sigma_{7E} = 2^{-3/2} Im S_{12E}$$

$$\sigma_{8E} = 2^{-3/2} Im S_{13E}$$

$$\sigma_{9E} = 2^{-3/2} Im S_{13E}$$

where Re denotes the real part and 1 m the imaginary part.

Figure 4:
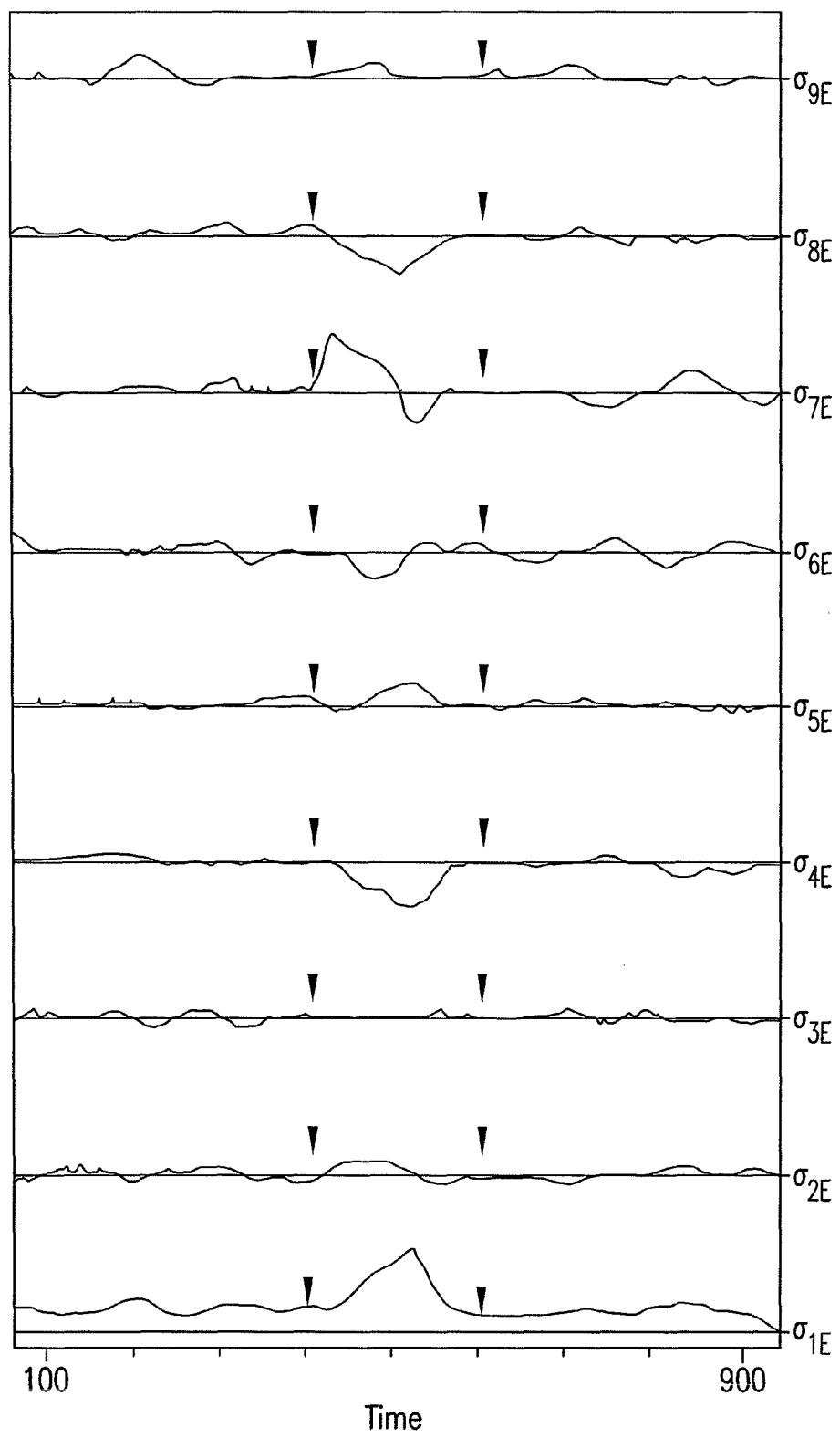
FIG. 4 shows the Stokes vectors $\sigma_{1E}$ computed at $f=0.1$ plotted as a function of time.

The Stokes vectors $\sigma_{1E}$ computed at $f=0.1$ are plotted as a function of time in FIG. 4. The arrows indicate the region of wave (b). The graph of $\sigma_{1E} = 3^{-1/2} Tr_E$ shows a maximum between 300 and 600 indicating the possible existence of a wave, but giving, however, no measure that the desired wave, exists. One other feature is worth comment. The parameters $\sigma_{7E}$, $\sigma_{8E}$ and $\sigma_{9E}$ show sizable values in the region 400-600. Since $\sigma_{7E}$, $\sigma_{8E}$, and $\sigma_{9E}$ are derived from ImS, they indicate the rotational component, or the angular momentum of the wave. The polarization ellipse for wave (b) has a minor axis which is half the length of the major axis, and consequently we expect a relatively large angular momentum component.

Figure 5:
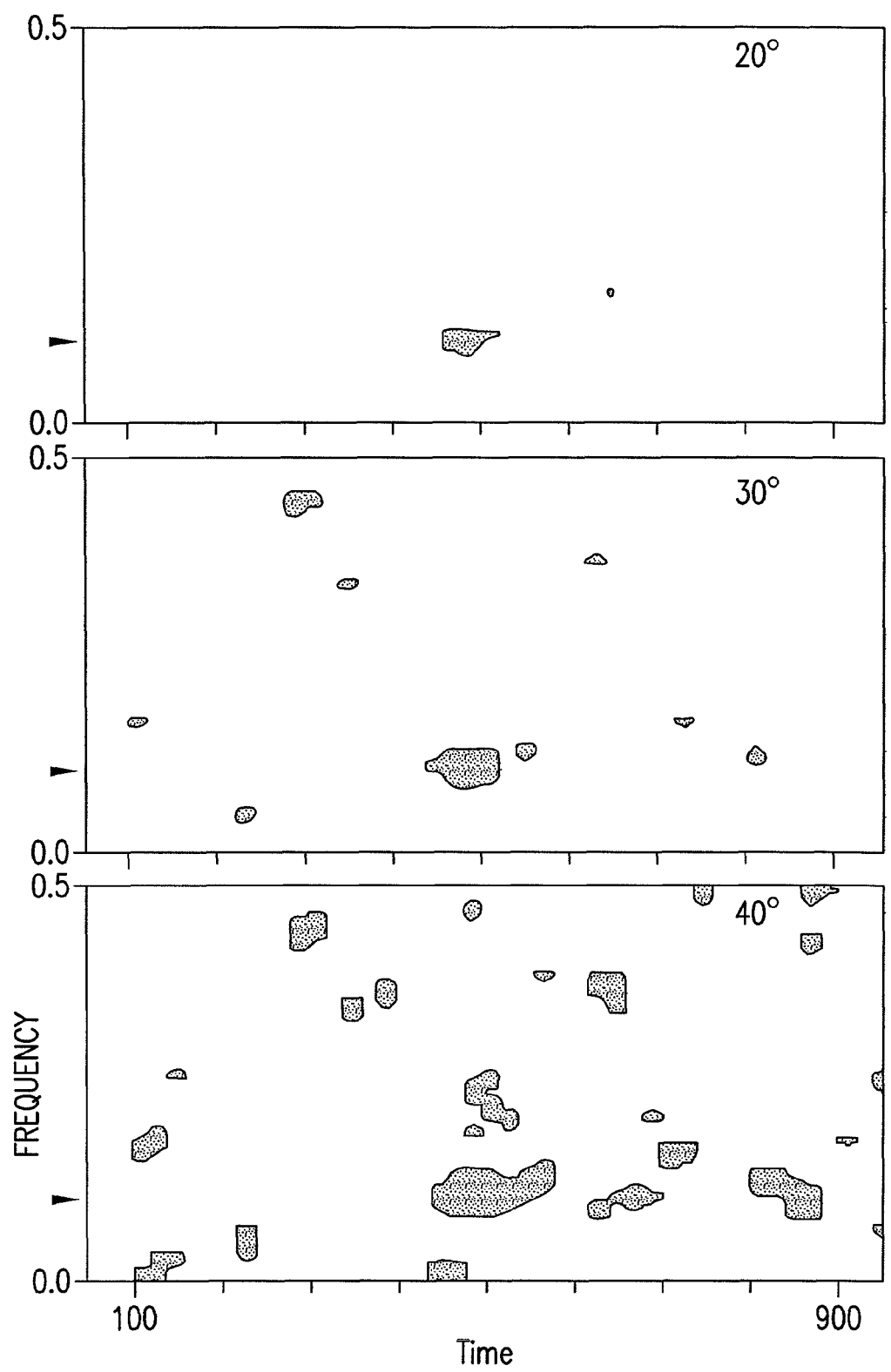
FIG. 5 shows the response of the detector as a function of frequency and time for three different acceptance angles where the dark areas indicate a detected signal and the dotted lines indicate the temporal region of wave (b)

To detect wave (b) we have used the criterion that the angle between the Stokes vector $\sigma_E$ and $\sigma(b)$ be less than a given value. Although this criterion will not necessarily optimize the tradeoff between the probability of detecting the wave and the probability of false responses, it allows for a simple illustration of the utility of the representation. FIG. 5 shows the response of the detector as a function of frequency and time for three different acceptance angles. The dark areas indicate a detected signal. The dotted lines indicate the temporal region of wave (b). When the angle is 40°, the detector responds to wave (b), but there are numerous false responses. This might be expected, since the angle of the cone is 55° for n=3. At 30°, wave (b) shows clearly but there are still a small number of false responses. Wave (b) is, however, easy to discern when compared with the false responses. Narrowing the acceptance angle to 20° eliminated all the false responses, and only the peak of wave (b) is evident. The probability of detecting (b) has decreased markedly, however, as one can see by comparing the region of the detector response for 20° with that for 40°. In this case, "best choice" for the acceptance angle is probably between 20° and 30°.

f) Conclusions

Although the Stokes vector representation of second-order stationary processes has no more information than that contained in the spectral matrix S, the representation has many simplicities which recommend its use. The representation is more compact in that the vector contains $n^2$ real numbers rather than the $(n^2-n)$ complex and n real numbers of the Hermitian spectral matrix (although this is not really a practical problem). A suitable choice of the set of vectors $u_j$ (j=1,n) (16) for constructing the basis set $V_j$ (j=1,$n^2$) can lead to a compaction of the information by reducing the number of nonzero components of the Stokes vectors. Similarly, the proper choice of the orthonormal matrix R (25) can lead to a reduction in the nonzero components, and the amount of data that needs to be manipulated or transmitted.

Probably one of the most important features of the Stokes vector representation is that it allows a real-space geometrical conceptualization of the polarization states of vector processes of arbitrary randomness. All the pure states lie on the surface of a cone in the Stokes vector space, and completely random or unpolarized states have Stokes vectors along the axis of the cone. For n=2, the geometrical analogy can be carried further by projecting the normalized Stokes vectors, $\sigma/\sigma$ onto the three-dimensional subspace orthogonal to $\sigma_1$. Since the cone is symmetric with respect to $\sigma_1$, all the pure states will lie on the surface of a sphere, and nonpure states will be represented by a vector within the sphere. This projection gives the Poincare sphere representation of the information (see E. F. Bolinder, *Geometric analysis of partially polarized electromagnetic waves*, IEEE Trans. Antennas and Propagation, AP-15 (1967), pp. 37-40, and references therein; incorporated by reference herein).

Also important is that the inner product in the Stokes vector space is operationally significant. By direct analogy with projections in a real n-dimensional space we have developed the concept of a generalized power spectrum which is an inner product in the Stokes vector space. Thus, the concept of power spectra can be generalized to include the power in any "direction" in a real unitary, or nonpure state space.

State Filters Based on Generalized Stokes Vectors

Embodiments described herein describe the construction of frequency domain estimates of generalized power density and the filters that can be constructed from those estimates. Using the concept of the Stokes vector representation of the spectral matrix in an M-dimensional vector space, a generalization of the process in which the spectral matrix may be represented by a set of trace-orthogonal matrices that are based upon a particular signal state can be produced. One aspect of the process is as follows: given a particular signal, represented as by a state vector in the space, a complete, orthonormal set of vectors can be produced that includes the signal of interest. Then, a generalized set of matrices is constructed, based upon the developed vectors, that are trace-orthogonal and which serve as a basis set for the expansion of the spectral matrix. The coefficients of this expansion form a generalized Stokes vector that represents the power in the spectral matrix associated with the various state vectors. Filters that serve to extract or suppress information about a particular state may then be constructed using the components of the generalized Stokes vectors. Although similar to previously described Pure-State filters, embodiments of the filters described herein are not constructed so as to produce estimates of the polarization for vector processes. The effectiveness of an embodiment this filter is demonstrated using acoustic data from a microphone array.

a) Introduction

For a wide-sense stationary process $|\chi(t)\rangle$ [$\chi_1(t), \chi_2(t), \ldots, \chi_M(t)$]$^T$ the cross-correlation matrix is defined as $$\Phi(\tau) = \epsilon[|\chi(t)\rangle \langle \chi(t-\tau)|] \tag{56}$$

Where $\epsilon[A]$ represents the expectation value of A. From the cross-correlation matrix the spectral matrix is formed via the Wiener-Kintchine theorem (see G. M. Jenkins and D. G. Watts, Spectral Analysis and its Applications, Holden-Day, 1968, incorporated herein by reference), as $$S(f) = \int_{-\infty}^{\infty} \Phi(\tau) e^{-i2\pi f \tau} d\tau \tag{57}$$

The spectral matrix is a complex, Hermitian, M×M matrix by construction and can be thought of as a density matrix describing the superposition of signals contained in the process at frequency $f$.

Given the spectral matrix, S, and an arbitrary vector, $|\psi\rangle$, in an M-dimensional space the power density associated with the state $|\psi\rangle$ is $$P_\psi = \langle \psi|S|\psi \rangle. \tag{58}$$

If we have a complete, ortho-normal set of vectors, $\{|a_i\rangle\}$, that span the complex vector space then we can represent the state $|\psi\rangle$ as a linear combination of the basis set as $$|\psi\rangle = \sum_{i=1}^{M} a_i |a_i\rangle \tag{59}$$

and $P_\psi$ can be written as $$P_\psi = \langle \psi|S|\psi \rangle \tag{60}$$
$$= Tr[S\rho]$$

Here, Tr[A] is the sum of the diagonal elements in the matrix A and $\rho$ is the matrix with values $$\rho_{ij} = \langle a_j|\psi\rangle \langle \psi|a_i\rangle. \tag{61}$$

It can be shown that $\rho$ is also Hermitian. In the case that $\rho$ is characterized by a single eigenvalue then the system is said to be in a 'pure-state' of information. For the purposes of this manuscript we view the spectral matrix as a density matrix that represents the superposition of signals at a frequency $f$. If the signal state is a pure state then the spectral matrix has a single, non-zero eigenvalue.

Once the spectral matrix is formed it is convenient to expand it in terms of a trace-orthogonal basis set of matrices. This expansion produces a set of independent projections that prove useful in characterizing the information states that are present in the spectral matrix. Samson (J. C. Samson, "*Descriptions of the polarization states of vector processes: applications to ULF magnetic fields*," Geophys. J. R. Astr. Soc., vol. 34, pp. 403-419, 1973; incorporated herein by reference) used the expansion of the spectral matrix in the traditional Stokes vector representation to identify purestates of information in a multivariate signal spectrum. Samson's expansion is based upon the Lie algebra of the special unitary group, that is, his expansion makes explicit use of the unit matrix as one of the basis matrices. The development here is more general in that it does not require that the unit matrix be a member of the group. The relaxation of this requirement allows the expansion of the power in the spectral matrix among states defined a-priori. The Stokes vector representation of the spectral matrix makes it possible to isolate a particular signal state, whether coherent clutter or incoherent noise. Once the signal state is identified a filter is constructed from the invariants of the spectral matrix and the filter can be used to suppresses that signal state.

This process is independent of the nature of the data. It is applicable to any multivariate data set that may arise from the union of data from different sensors or from data from an array of like sensors. As an example of the application of this process to a multivariate data set we will treat a set of acoustic data taken from a microphone array.

b) A Basis for Generalized Stokes Vector Representation

The Stokes vector representation of the spectral matrix representing multivariate data has been described in J. C. Samson, "*Descriptions of the polarization states of vector processes: applications to ULF magnetic fields*," Geophys. J. R. Astr. Soc., vol. 34, pp. 403-419, 1973 and J. C. Samson and J. V. Olson, "*Generalized Stokes vectors and generalized power spectra for second-order stationary vector-processes*," SIAM J. Appl. Math., vol. 40, no. 1, pp. 137-149, February 1981, both incorporated herein by reference. The formulation begins with the description of a set of trace-orthogonal matrices as the basis for the expansion. If the basis set contains the identity matrix then the standard Stokes vector representation is obtained and the basis is related to the matrices that describe the special-unitary Lie group. In the case to be explored here, we do not require that the unit matrix be a member of the set. In this case we have a quasi-group of matrices and a generalized Stokes vector can be defined with properties that are useful in the analysis multivariate signal processes.

Equation (60) is the starting point for this discussion. Let is assume that we have a set of $M^2$ trace-orthogonal matrices $\{U_i\}$, where the subscript i denotes the matrix. Then the spectral matrix may be expanded in this set as $$S = \sum_{i}^{M^2} \sigma_i U_i \qquad (62)$$

The coefficients, $\sigma_i$, may be obtained by multiplying equation (62) by $U_j$, taking the trace, and invoking the orthogonality condition $Tr[U_i U_j] = \delta_{ij}$. When this is done one obtains $$\sigma_j = Tr[U_j S]. \qquad (63)$$

Since the members of the set $\{U_i\}$ are trace orthogonal the coefficients are independent of each other. If we now collect the coefficients into a vector, $\vec{\sigma}$, we have the generalized Stokes vector:

$$\vec{\sigma} = [\sigma_1, \sigma_2, \ldots \sigma_{M^2}]^T \qquad (64)$$

In the search for pure states of information the traditional Stokes vector expansion is defined such that the first matrix is proportional to the unit matrix, that is $U_1 = I$. In the description of signal states, the spectral matrix that represents noise of constant amplitude across all sensors that is also uncorrelated between sensors is proportional to the unit matrix. Expansion of the spectral matrix based upon the unit matrix as one element of the expansion is used to describe vector processes such as the 2-dimensional polarization of light as well as the polarization of particles with spin ½ and the basis matrices are the su(2) matrices known as the Pauli matrices (F. A. Kaempffer, *Concepts in Quantum Mechanics*, Academic Press, 1965; incorporated herein by reference). For higher dimensions a general prescription for generating the basis set is well known (W. Pfeifer, *The Lie Algebras su(N)*, Birkhauser, 2003; incorporated herein by reference). This approach to identifying and isolating pure states of information is the one exploited by Samson (J. C. Samson, "*Descriptions of the polarization states of vector processes: applications to ULF magnetic fields*," Geophys. J. R. Astr. Soc., vol. 34, pp. 403-419, 1973; incorporated herein by reference).

The use of a generalized Stokes vector representation arises in another context. Consider the problem of trying to isolate, identify and perhaps reject signals that are considered a nuisance: clutter signals. If the state vector representing such a signal can be identified then it can be used as a starting point for the construction of a trace-orthogonal set. Let us assume that the state vector $|A\rangle$ represents a signal of interest or clutter in a multivariate data set. The first step in forming a basis for expansion of the spectral matrix is to use the Gram-Schmidt orthogonalization procedure to create a complete, orthonormal set that spans the vector space and contains $|A\rangle$ as a member. Once this is done, and assuming that the set is $\{|a_i\rangle\}$ with $|a_1\rangle = A\rangle$ then a set of trace orthogonal matrices can be constructed using a process described by Samson and Olson (J. C. Samson and J. V. Olson, "Generalized Stokes vectors and generalized power spectra for second-order stationary vector-processes," SIAM J. Appl. Math., vol. 40, no. 1, pp. 137-149, February 1981; incorporated herein by reference). First, note that for each of the $|a_i\rangle$ the matrices $V_{ii} = |a_i\rangle\langle a_i|$ are mutually trace orthogonal:

$$Tr[V_i V_j] = Tr[|a_i\rangle\langle a_i|a_j\rangle\langle a_j|] \qquad (65)$$

With this insight, the $M^2$ matrices can be constructed by defining matrices through the Hermitian outer products of the $\{|a_i\rangle\}$:

$$V_{(k)}^{(+)} = (2 + 2\delta_{ij})^{-1/2}(|a_i\rangle\langle a_j| + |a_j\rangle\langle a_i|)$$

$$V_{(k)}^{(-)} = i2^{-1/2}\delta_{ij}(|a_i\rangle\langle a_j| - |a_j\rangle\langle a_i|) \qquad (66) \text{ and } (67)$$

where the subscripts k represents the matrix and is related to the subscripts i and j in some convenient way to keep things in order. There are $(M^2 + M)/2$ matrices $V^{(+)}$ and $(M^2 - M)/2$ matrices $V^{(-)}$.

As discussed above, the power spectral density at a frequency $f$ associated with the state $|\psi\rangle$ is given by $P_\psi(f) = \langle \psi|S(f)|\psi\rangle = Tr[S(f)|\psi\rangle\langle\psi|]$. If we expand both S and $U_\psi = |\psi\rangle\langle\psi|$ in the basis $\{U_i\}$, the power can be rewritten as $$P_\psi(f) = \sum_{i=1}^{M^2} \sum_{j=1}^{M^2} \sigma_i \gamma_j Tr[U_i U_j] \qquad (68)$$

$$= \sum_{i=1}^{M^2} \sigma_i \gamma_j \qquad (69)$$

This result implies that the power can be written as the inner product of the two generalized Stokes vectors $$P_\psi(f) = \vec{\sigma} \cdot \vec{\gamma} \qquad (70)$$

where we assume throughout that the state vector $|\psi\rangle$ is normalized.

c) A Stokes Vector Filter

Once the basis set $\{U_j\}$ is known we may construct filters of various sorts that will suppress unwanted clutter whether that clutter is due to broadband noise or coherent signals. This is possible since the generalized Stokes vector representation enables us to identify the information about a particular signal state. Let us take $|\psi\rangle$ to represent a signal state of interest. Using the method outlined above, we can generate a set of orthonormal vectors that contains $|\psi\rangle$. Once these are defined we then construct a set of trace-orthogonal matrices according the definitions given in equations (66) and (67). For our purposes here, let $V_1$ be the member of the trace-orthogonal set that represents the state $|\psi\rangle$. We may isolate the contribution of this state to the spectral matrix by writing $$S = \sigma_1 V_1 + \sum_{i=2}^{M^2} \sigma_i V_i \tag{71}$$

$$\sum_{i=2}^{M^2} \sigma_i V_i$$

In this expression represents all of the power not associated with the state $|\psi\rangle$. From this we can construct a function that ranges between zero and one according to whether the state $|\psi\rangle$ is present. This can be done by taking the ratio of the non-$|\psi\rangle$ power to the total power $$P_\psi = \frac{\sum_{i=2}^{M^2} \sigma_i^2}{\sum_{i=2}^{M^2} \sigma_i^2}. \tag{72}$$

Now, simplify this and express it in terms of invariants by letting $$\sigma_1 = Tr[SV_1] \tag{73}$$

$$\sum_{i=1}^{M^2} \sigma_i^2 = \sigma_1^2 + \sum_{i=1}^{M^2} \sigma_i^2$$

$$\sum_{i=1}^{M^2} \sigma_i^2 = Tr[S^2]$$

When these are inserted into equation (72), we obtain $$P\psi = \left( \frac{Tr[S^2] - (Tr[SV_1])^2}{Tr[S^2]} \right) \tag{74}$$

The reformulation of $P\psi$ in terms of the invariants of the spectral matrix shown in equation (74) removes the dependency of the estimate on the original basis set. That is, application of this filter depends only upon knowledge of the spectral matrix and the state vector representing the signal of interest.

Note that when the spectral matrix is a function of $|\psi\rangle$ only, that is, it represents a pure state of information, then $P\psi=0$; and when the state $P\psi$ is not present $P\psi=1$. When $P\psi$ is evaluated at all frequency estimates we have a function of frequency for which $0<P\psi<1$. Then, $P\psi$ can be used as a filter in the frequency domain. The filter is invoked as follows: First, the Fourier transform of the multivariate data set is computed. Next, the spectral matrices estimated for the entire spectrum and the value of $P\psi$ is found at each frequency element. Finally, the original Fourier transforms of the multivariate data are multiplied by $P\psi$ and the transforms are inverted to the time domain achieving a filtered waveform.

This filter is closely related to the Pure-State filter of Samson and Olson (J. C. Samson and J. V. Olson "Data-adaptive polarization filters for multichannel geophysical data," Geophysics, vol. 46, no. 10, pp. 1423-1431, October 1981; incorporated herein by reference). If we let $V_1=I$, the identity matrix, the filter suppresses uncorrelated noise in multivariate data very effectively (see J. V. Olson, "Noise suppression using data-adaptive polarization filters: Applications to infrasonic array data," J. Acoust. Soc. Am., vol. 75(5), pp. 1456-1460, November 1982; incorporated herein by reference). However, it should be pointed out that the Samson and Olson Pure-State filter is not based upon equation (74) but is defined in such a way as to preserve the definitions of polarization for vector data.

In the application described herein filters can be constructed using two different strategies: first, we will show the suppression of the dominant, coherent signal at each frequency across the spectrum by assigning the dominant eigenvector of each spectral matrix as the state vector, $|\psi\rangle$ when treating that matrix; second, we will show the suppression of a single clutter signal through the use a single, fixed state vector, derived from the principal eigenvalue of the spectral matrix taken from the center of the frequency band of a particular clutter signal, and apply it to all spectral matrices across the frequency band.

d) Clutter Reduction Using an Adaptive State Filter

Figure 6A:
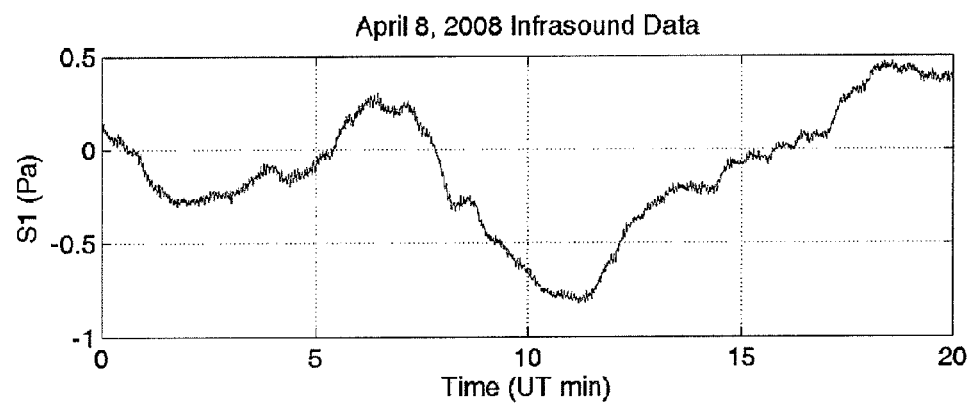
FIGS. 6a and 6b show the raw waveform and power spectrum, computed using the standard Welch method as implemented in the MatLab signal processing tool box (The MathWorks, Inc., Natick, Mass.) derived from a 20 minute segment of data taken from one sensor from a set of acoustic pressure data taken from an eight-element infrasound microphone array in Fairbanks, Ak. on 8 Apr., 2008, this array is part of the International Monitoring System (IMS) of the Comprehensive Nuclear Test-Ban Treaty Organization (CTBTO) and the eight infrasound data channels in the Alaskan array are sampled at 20 Hz.
Figure 6B:
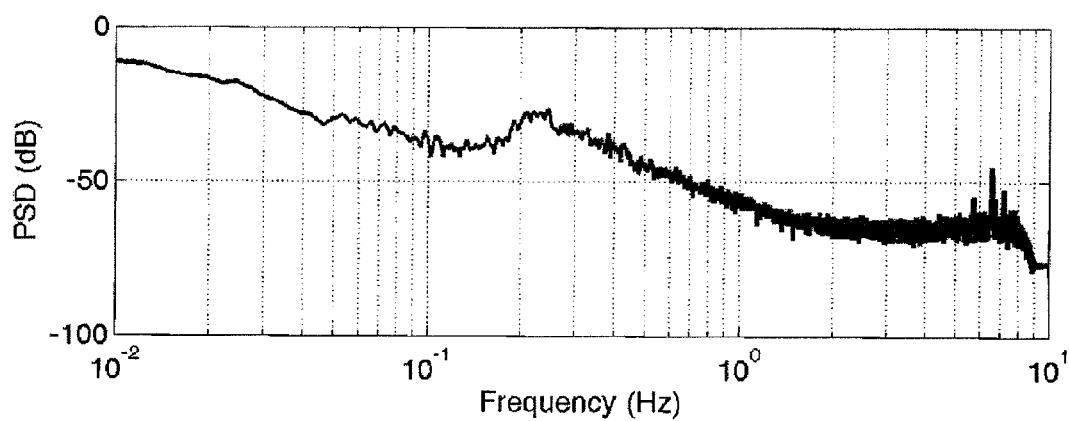

As an example of the application of the state filter of equation (74) to actual data, consider a set of acoustic pressure data taken from an eight-element infrasound microphone array in Fairbanks, Ak. on 8 Apr., 2008. This array is part of the International Monitoring System (IMS) of the Comprehensive Nuclear Test-Ban Treaty Organization (CTBTO). The eight infrasound data channels in the Alaskan array are sampled at 20 Hz. FIGS. 6a and 6b show the raw waveform and power spectrum, computed using the standard Welch method as implemented in the MatLab signal processing tool box (The MathWorks, Inc., Natick, Mass.) derived from a 20 minute segment of data taken from one sensor. The spectrum is characterized by approximately 8 degrees of freedom and exhibits several clutter signals. At the lowest frequencies, below ~0.1 Hz, the spectrum is dominated by non-acoustic, atmospheric gravity waves while in the frequency band between 0.1 Hz and 0.5 Hz a set of signals appears that is due to acoustic waves generated by marine storms. These waves, known as 'microbaroms', have been widely studied and are generally present in infrasound data sets world wide. Above 1 Hz there are a series of narrow tones resulting from local sources such as building air-conditioning fans, etc. as well as electronic noise from instrumentation.

If the entire spectrum is viewed as clutter dominated, the principal clutter signals can be removed by constructing the matrix $V_1$ in equation (74) from the eigenvector associated with the dominant eigenvalue of each spectral matrix in the frequency band. The result of this operation is shown in FIG.

Figure 7:
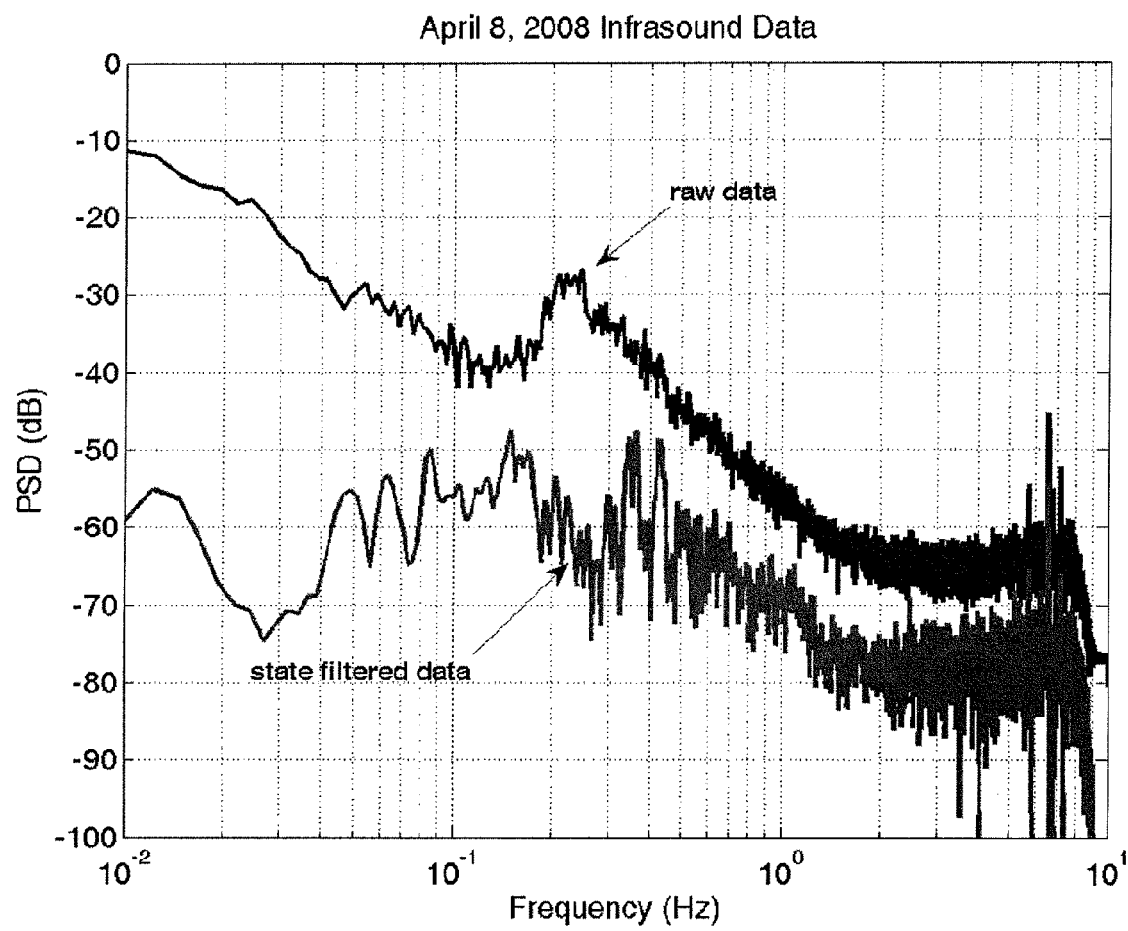
FIG. 7 shows the result of an operation for removing the principal clutter signals from a clutter-dominated spectrum by constructing the matrix $V_1$ in equation (74) from the eigenvector associated with the dominant eigenvalue of each spectral matrix in the frequency band.

7. There, the original power spectrum (raw data) is retained for reference and the spectrum resulting from applying the generic filter (state filtered data) is also shown. When the spectral matrix represents a pure state there is only one non-zero eigenvalue and the entire power density represented by that matrix is suppressed by the filter. In other cases, where there are mixed states of information, the matrix $V_1$ is constructed in the same way using the eigenvector associated with the dominant eigenvalue. However, in this case $V_1$ does not represent the total signal power in the matrix and only the power associated with the dominant (state) eigenvector is suppressed, leaving the residual power present from other states. This analysis helps understand the results in FIG. 7. At the lowest frequencies the spectral matrices are dominated by a single eigenvalue/eigenvector and these signals are suppressed by 30 to 50 dB. Similarly, the microbarom peak is suppressed by over 30 dB. At other frequencies the reduction is not as large indicating the presence of other signal states. The narrow-band clutter lines above 1 Hz show some reduction also. The residual power represents the power remaining due to states contributing power to the spectral matrix at levels below that of the principal eigenvector.

Figure 8A:
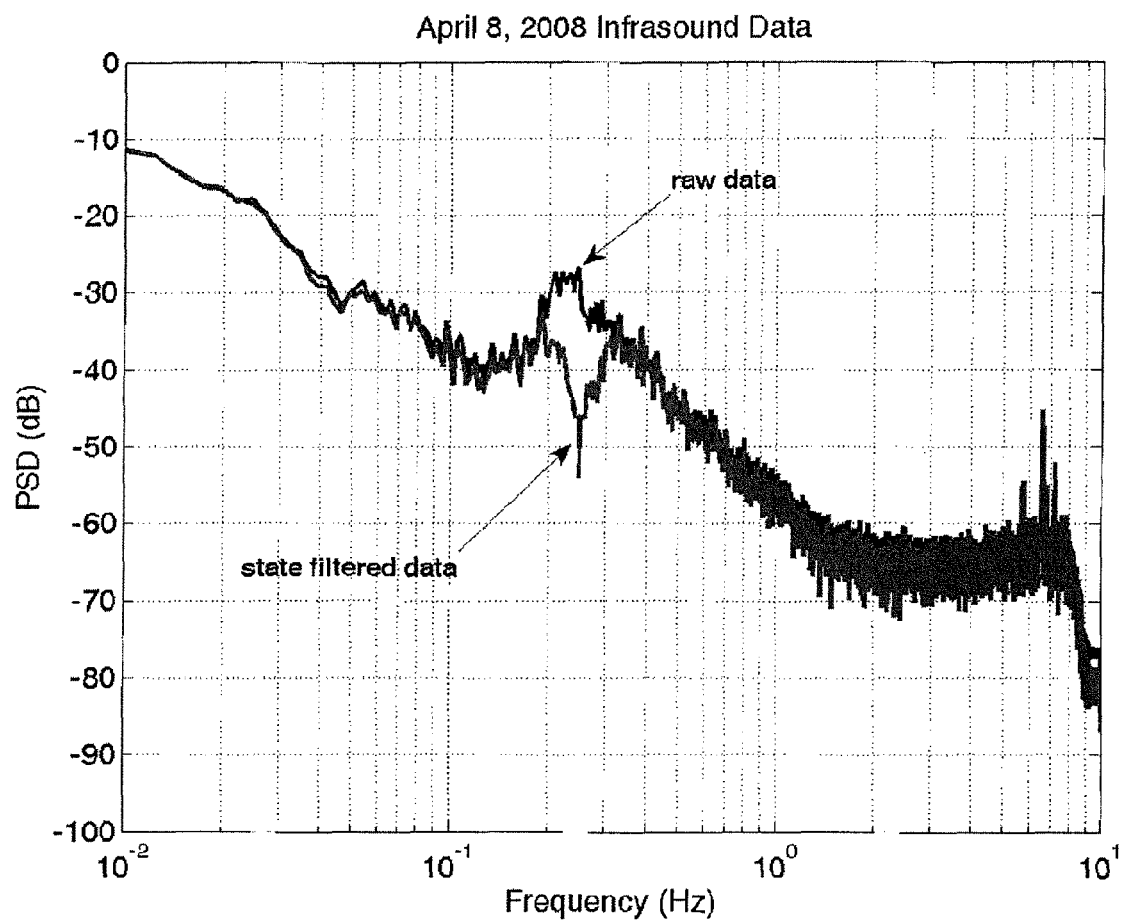
FIGS. 8a and 8b show the comparison of raw to filtered spectra when it is desired to suppress a particular signal state across the spectrum whereby the matrix $V_1$ of equation (74) is constructed by extracting the principal eigenvector from the peak of the microbarom spectrum near 0.24 Hz.
Figure 8B:
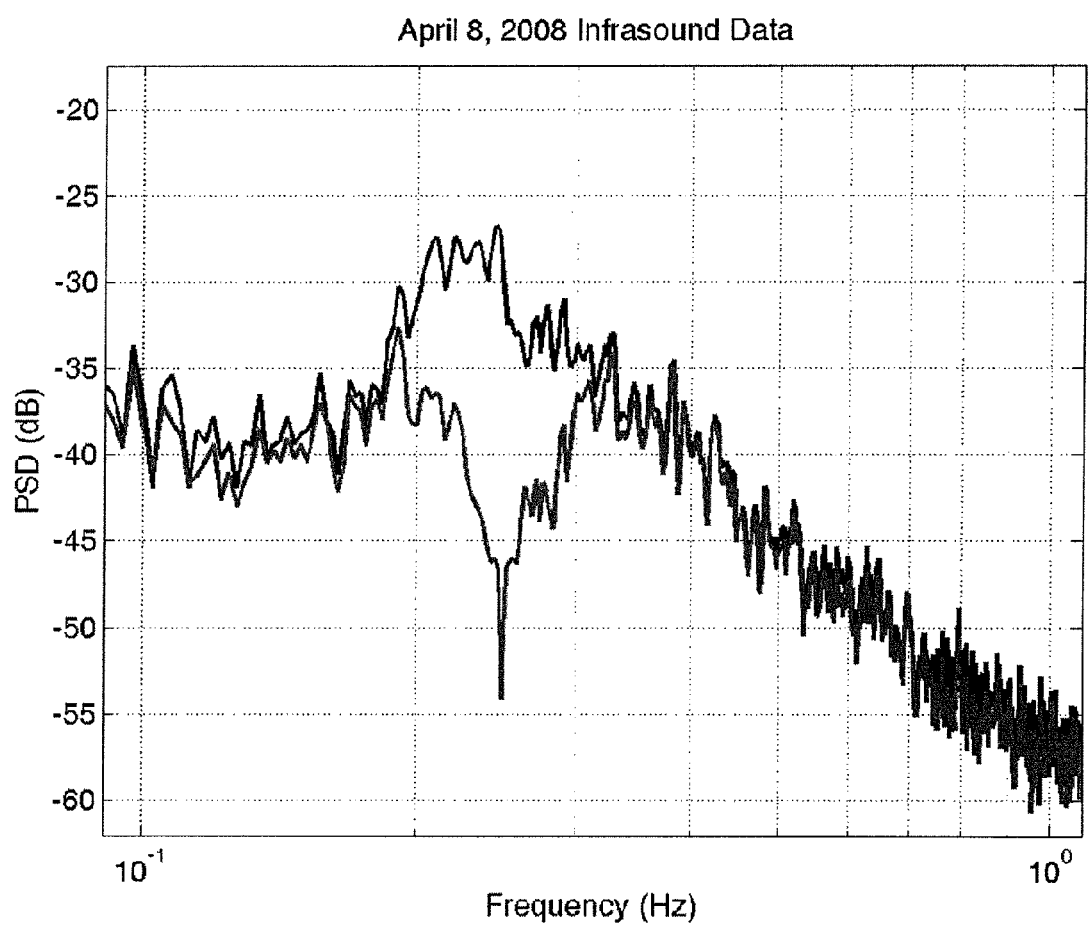

An alternate approach can be based on a preference to suppress a particular signal state across the spectrum. To illustrate this, the matrix $V_1$ of equation (74) is constructed by extracting the principal eigenvector from the peak of the microbarom spectrum near 0.24 Hz. FIGS. 8a and 8b show the comparison of raw to filtered spectra when this approach is chosen. Here, it can between that the dominant spectral peak in the range from 0.1 Hz to 0.5 Hz that occurs near 0.24 Hz has been reduced by approximately 20 dB and the spectrum near that peak has been reduced to the extent that V1 is the dominant term. Clearly, as one moves away from the peak the nature of the eigenvalue/eigenvector distribution from matrix to matrix is changing. If one wanted to remove more of the clutter, a sequence of operations in which the principal eigenvector from successive frequency bands could be used to produce a sequential set of filters. Similarly, stacking several filters could be used to remove the harmonics of a periodic signal.

Figure 9A:
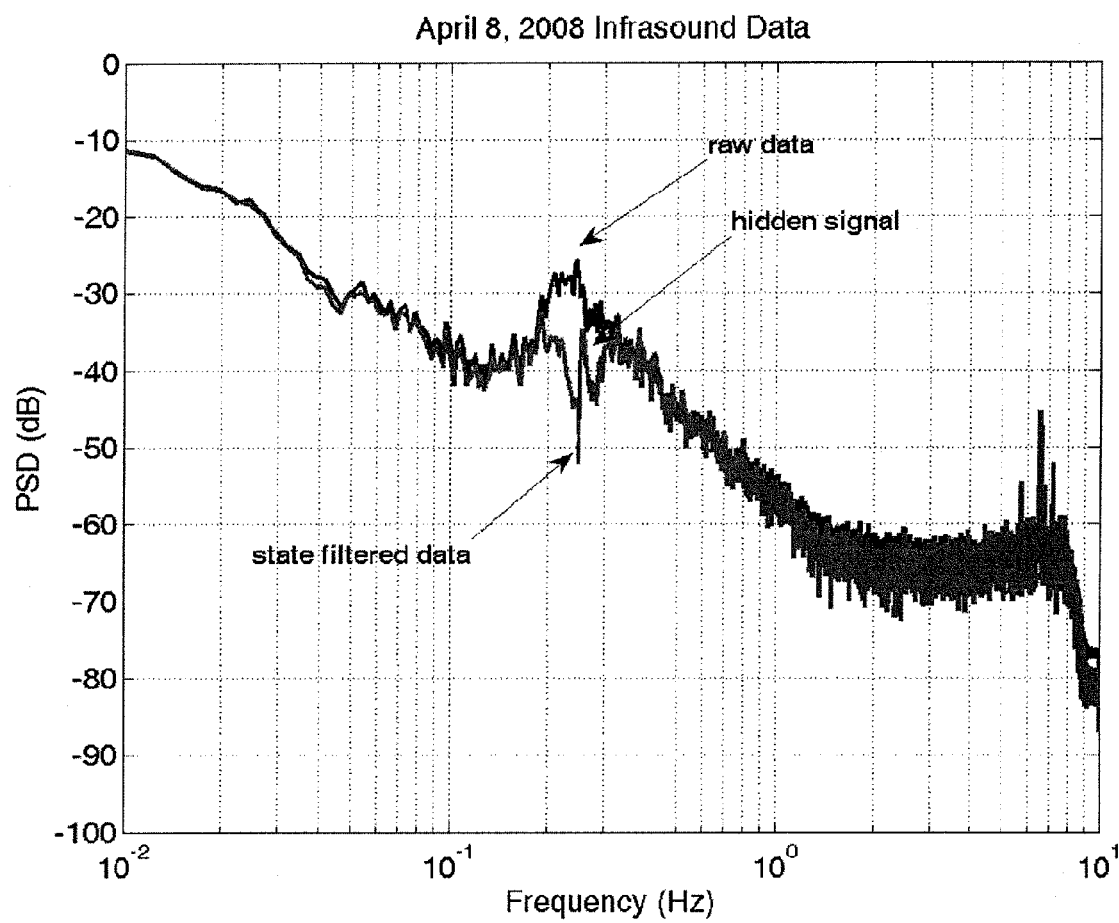
FIGS. 9a and 9b illustrate an exemplary instance in which a small signal is embedded in the microbarom data and an embodiment of a filter is used to suppress clutter and recover weak signals at the same frequency.
Figure 9B:
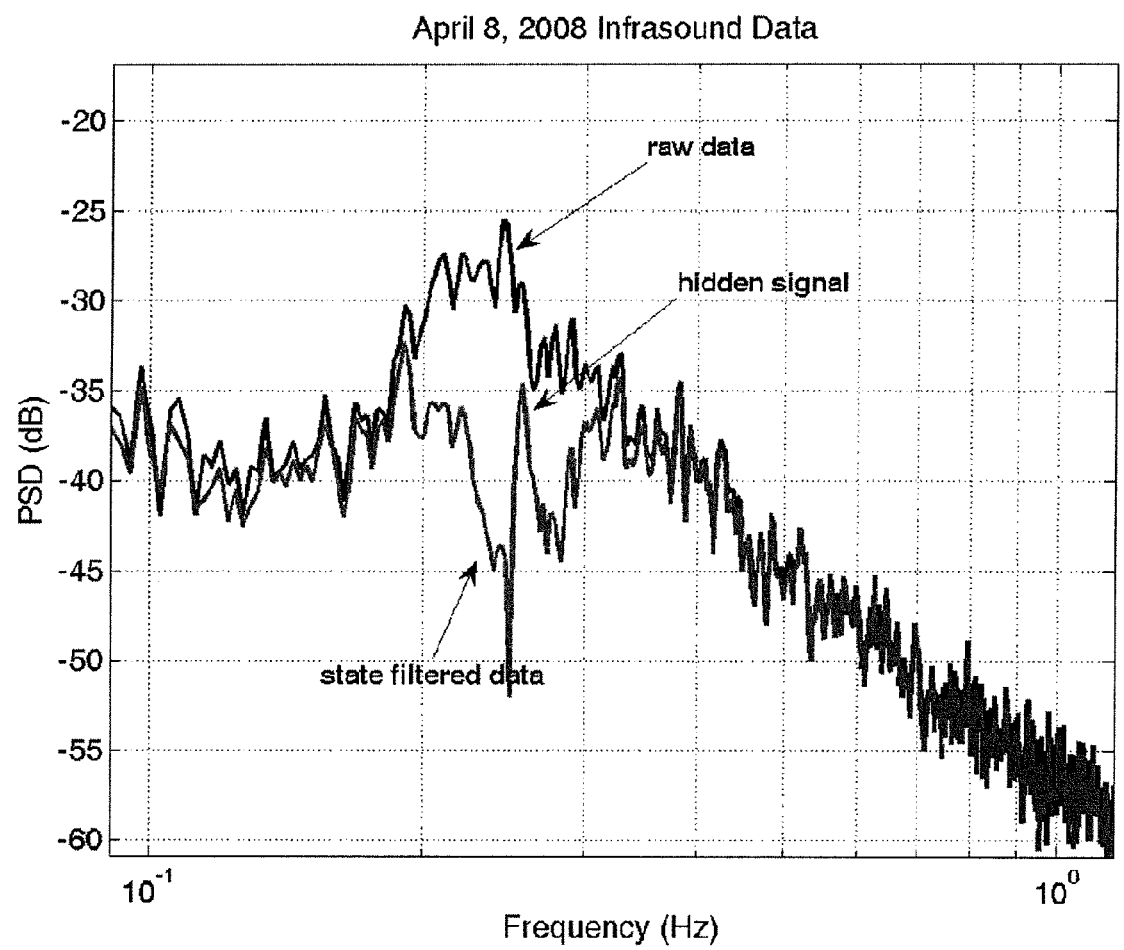

Recall once again that in computing equation (74) during the filter process that the matrix $V_1$ is constructed from the eigenvector associated with the dominant eigenvalue of the spectral matrix at each frequency. This is important since if there is a signal of interest that is buried beneath the microbarom signal it is not affected by the filter. We can use the filter to suppress clutter and recover weak signals at the same frequency. This feature is shown in FIGS. 9a and 9b, in which a small signal is embedded in the microbarom data. The signal is generated analytically to represent a small wave packet arriving from an azimuth different than the microbarom signals but with a frequency of 0.25 Hz that is within the microbarom band. Again we show the spectrum of the raw data with the superposed signal and the state-filtered data. The dominant microbarom signal has been suppressed leaving the power density of the smaller signal unchanged and clearly identifiable.

e) Discussion

Described herein are embodiments of a set of filters that can be constructed so as to suppress or emphasize certain signal states in multivariate data sets. The filters are based upon the estimators of power density of particular signal states at each frequency component in the frequency domain. Once determined, the filter amplitudes are impressed on the Fourier transform of the input data and a filtered time series is obtained when the inverse transform is computed.

The filters described here are based upon a quasi-group of matrices that are constructed to form a trace-orthogonal basis on which the spectral matrix can be expanded. The coefficients of the expansion are the estimates of the power density associated with each matrix. We begin by defining a signal state of interest and then constructing an orthonormal basis via the Gram-Schmidt process and finally generating the trace-orthogonal set of matrices using a general formulation of the combinations of the outer product of the members of the vector basis. This approach is similar to that of Samson (previously incorporated herein) in which pure states of information were defined based upon the traditional Stokes vector expansion of the spectral matrix. However, the current approach is different in that we do not require that the unit matrix be a member of our basis set. This approach allows a more general description of the signal power contained in the spectral matrix. A second difference is that Samson's estimator is constructed to be consistent with standard definitions of polarization for vector processes. This leads to the basis set of matrices specified by the su(N) algebra based upon standard Lie groups. Ours does not follow this restriction and the set of matrices developed as our basis is not a formal group since it lacks the identity matrix.

In practice the suppression of unwanted signal states by as much as 20 dB, or more, relative to the unfiltered data can be achieved for instances where the spectral matrix represents a pure state. In cases where the spectral matrix contains the contributions from several coherent signals it is the dominant signal that is suppressed in one embodiment. This feature allows the minor signals to survive the process unless the state vector for the minor signal is the same as the signal to be suppressed. For an array of sensors the components of the state vector are related to the phases of the signal in the data set. The component phases depend upon frequency, trace speed and angle of arrival of the incoming wave. In order to differentiate between signal and clutter it is necessary that the phase changes be distinct between the state vectors representing the two. Since, for acoustic data, we assume the frequency band and the trace speed of the signals across an array are the same the only discriminant left is the angle of arrival. For planar arrays with sensors located at fixed locations in the horizontal plane, the ability of an array to discriminate between signals is then a function of the angular resolution afforded by the array geometry. This is traditionally shown through plots that show the sensitivity of the array (antenna) as a function of angle: the array beam form. If one uses the standard methods for the estimation of power density such as the Welch method, the procedure gives rise to the ordinary Bartlett window in azimuth which gives an unbiased estimate of the azimuth of arrival but has a very broad beam width. This can be reduced by methods for resolving the state vectors that provide higher resolution. In one aspect, another estimator that has a narrower beam, such as the Maximum-Liklihood estimator, can be used such that signals can be tracked closer to the microbarom azimuth than is possible with the Bartlett estimator.

Figure 10:
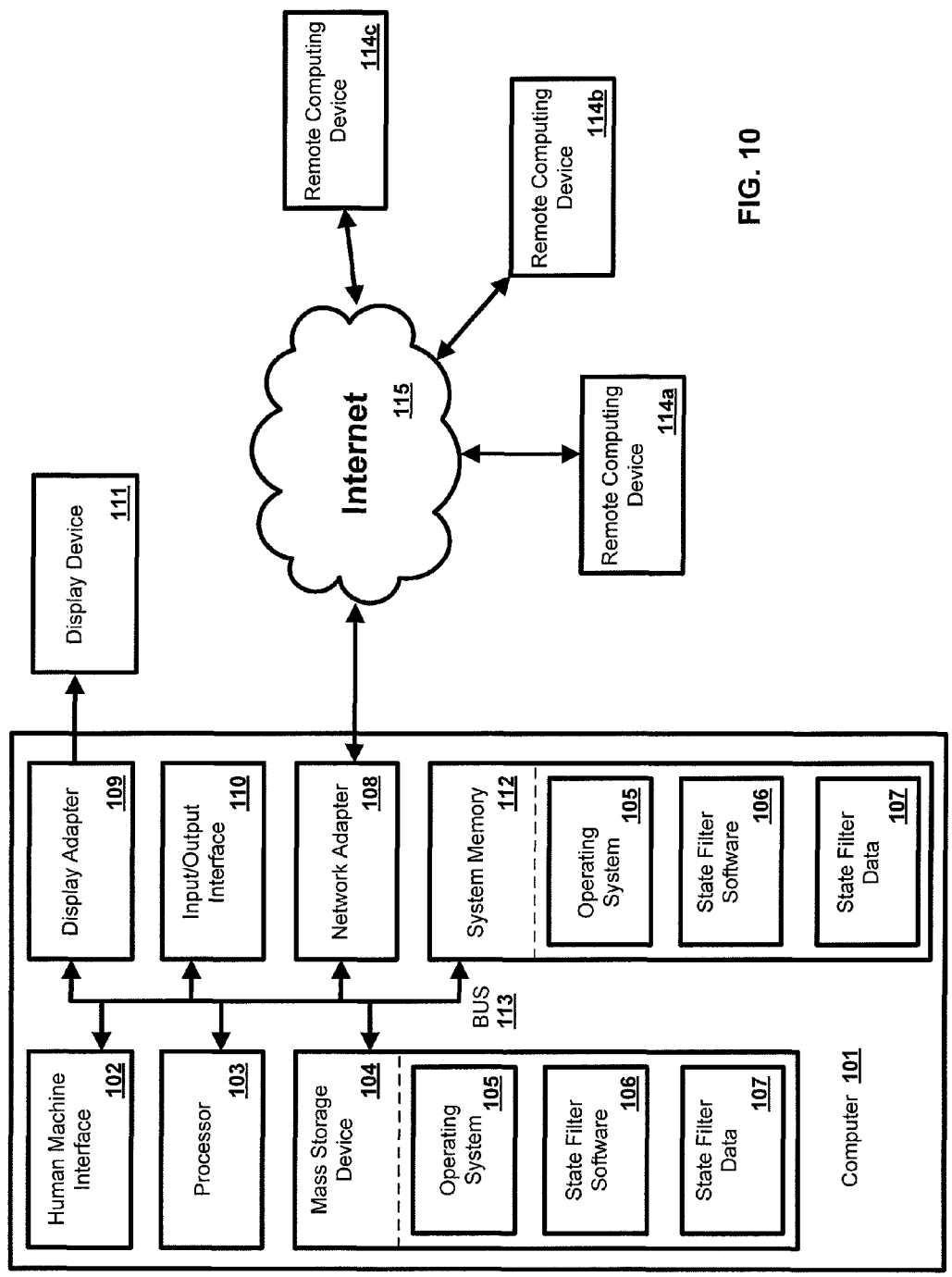
FIG. 10 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the state filter software 106 as illustrated in FIG. 10 and described below, which can be computer software encoded to execute the calculations as described herein. In one exemplary aspect, the units can comprise a computer 101 as illustrated in FIG. 10 and described below.

FIG. 10 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, state filter software 106, state filter data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as state filter data 107 and/or program modules such as operating system 105 and state filter software 106 that are immediately accessible to and/or are presently operated on by the processing unit 103.

In another aspect, the computer 101 can also comprise other removable/non-removable, volatile/non-volatile computer storage media. By way of example, FIG. 10 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and state filter software 106. Each of the operating system 105 and state filter software 106 (or some combination thereof) can comprise elements of the programming and the state filter software 106. State filter data 107 can also be stored on the mass storage device 104. State filter data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In another aspect, the computer 101 can receive data and information via one or more sensors, transducers or other devices such as, for example, pressure sensors, optical sensors, proximity sensors, strain gauges, temperature sensors, etc. These and other such devices can be connected to the processing unit 103 via an interface that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of state filter software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented state filter comprising receiving, using a computer, a multivariate data set;
   receiving, using the computer, information about a particular signal state, wherein said information is represented by a state vector of interest;
   generating, using the computer, a set of orthonormal vectors from the multivariate data set that contains the state vector of interest;
   constructing, using the computer, a generalized set of matrices based upon the set of orthonormal vectors, that are trace-orthogonal and which serve as a basis set for expansion of a spectral matrix;
   forming, using the computer, a generalized Stokes vector from coefficients of the expansion, wherein the generalized Stokes vector that represents power in the spectral matrix associated with the state vector of interest; and
   constructing, using the computer, filters that serve to extract or suppress information about a particular state using components of the generalized Stokes vector.

2. The method of claim 1, wherein constructing, using the computer, filters that serve to extract or suppress information about a particular state using components of the generalized Stokes vector comprises suppression of a dominant, coherent signal at each frequency across a spectrum of the multivariate data set by assigning a dominant eigenvector of the spectral matrix as the state vector of interest, $|\psi\rangle$ when treating that spectral matrix.

3. The method of claim 1, wherein constructing, using the computer, filters that serve to extract or suppress information about a particular state using components of the generalized Stokes vector comprises suppression of a single clutter signal through use of a single, fixed state vector, derived from a principal eigenvalue of the spectral matrix taken from a center frequency band of a particular clutter signal, and applying the fixed state vector to all spectral matrices across a frequency band occupied by the clutter signal.

4. The method of claim 1, wherein constructing, using the computer, filters that serve to extract or suppress information about a particular state using components of the generalized Stokes vector comprises suppression of a dominant, coherent signal at each angle across a span of the multivariate data set by assigning a dominant eigenvector of the spectral matrix as the state vector of interest, $|\psi\rangle$ when treating that spectral matrix.

5. The method of claim 1, wherein constructing, using the computer, filters that serve to extract or suppress information about a particular state using components of the generalized Stokes vector comprises suppression of a dominant, coherent signal at each velocity over an interval of the multivariate data set by assigning a dominant eigenvector of the spectral matrix as the state vector of interest, $|\psi\rangle$ when treating that spectral matrix.

6. The method of claim 1, wherein constructing, using the computer, filters that serve to extract or suppress information about a particular state using components of the generalized Stokes vector comprises suppression of a single clutter signal through use of a single, fixed state vector, derived from a principal eigenvalue of the spectral matrix taken from a center angle band of a particular clutter signal, and applying the fixed state vector to all spectral matrices across an angle band occupied by the clutter signal.

7. The method of claim 1, wherein constructing, using the computer, filters that serve to extract or suppress information about a particular state using components of the generalized Stokes vector comprises suppression of a single clutter signal through use of a single, fixed state vector, derived from a principal eigenvalue of the spectral matrix taken from a center velocity band of a particular clutter signal, and applying the fixed state vector to all spectral matrices across a velocity band occupied by the clutter signal.

8. A device comprised of:
a memory; and
a processor, wherein said processor is configured to executed computer-executable code sections stored in said memory, said computer-executable code sections for performing the steps of:
receiving a multivariate data set;
receiving information about a particular signal state, wherein said information is represented by a state vector of interest;
generating a set of orthonormal vectors from the multivariate data set that contains the state vector of interest;
constructing a generalized set of matrices based upon the set of orthonormal vectors, that are trace-orthogonal and which serve as a basis set for expansion of a spectral matrix;
forming a generalized Stokes vector from coefficients of the expansion, wherein the generalized Stokes vector that represents power in the spectral matrix associated with the state vector of interest; and
constructing filters that serve to extract or suppress information about a particular state using components of the generalized Stokes vector.

9. The device of claim 8, wherein constructing filters that serve to extract or suppress information about a particular state using components of the generalized Stokes vector comprises suppression of a dominant, coherent signal at each frequency across a spectrum of the multivariate data set by assigning a dominant eigenvector of the spectral matrix as the state vector of interest, $|\psi\rangle$ when treating that spectral matrix.

10. The device of claim 8, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center frequency band of a particular clutter signal, and applying the fixed state vector to all spectral matrices across a frequency band occupied by the clutter signal.

11. The device of claim 8, further comprising one or more sensors operably connected with said processor and memory, wherein said multivariate data set is obtained at least in part from signals from said one or more sensors.

12. The device of claim 8, wherein constructing filters that serve to extract or suppress information about a particular state using components of the generalized Stokes vector comprises suppression of a dominant, coherent signal at each angle across a span of the multivariate data set by assigning a dominant eigenvector of the spectral matrix as the state vector of interest, $|\psi\rangle$ when treating that spectral matrix.

13. The device of claim 8, wherein constructing filters that serve to extract or suppress information about a particular state using components of the generalized Stokes vector comprises suppression of a dominant, coherent signal at each velocity over an interval of the multivariate data set by assigning a dominant eigenvector of the spectral matrix as the state vector of interest, $|\psi\rangle$ when treating that spectral matrix.

14. The device of claim 8, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center angle band of a particular clutter signal, and applying the fixed state vector to all spectral matrices across an angle band occupied by the clutter signal.

15. The device of claim 8, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center velocity band of a particular clutter signal, and applying the fixed state vector to all spectral matrices across a velocity band occupied by the clutter signal.

16. A system comprised of a memory;
a processor; and
one or more sensors operably connected with said processor and memory, wherein said processor is configured to executed computer-executable code sections stored in said memory, said computer-executable code sections for performing the steps of:
receiving a multivariate data set, wherein said multivariate data set is obtained at least in part from signals from said one or more sensors;
receiving information about a particular signal state, wherein said information is represented by a state vector of interest;
generating a set of orthonormal vectors from the multivariate data set that contains the state vector of interest;
constructing a generalized set of matrices based upon the set of orthonormal vectors, that are trace-orthogonal and which serve as a basis set for expansion of a spectral matrix;
forming a generalized Stokes vector from coefficients of the expansion, wherein the generalized Stokes vector that represents power in the spectral matrix associated with the state vector of interest; and
constructing filters that serve to extract or suppress information about a particular state using components of the generalized Stokes vector.

17. The system of claim 16, wherein constructing filters that serve to extract or suppress information about a particular state using components of the generalized Stokes vector comprises suppression of a dominant, coherent signal at each frequency across a spectrum of the multivariate data set by assigning a dominant eigenvector of the spectral matrix as the state vector of interest, $|\psi\rangle$ when treating that spectral matrix.

18. The system of claim 16, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center frequency band of a particular clutter signal, and applying the fixed state vector to all spectral matrices across a frequency band occupied by the clutter signal.

19. The system of claim 16, wherein constructing filters that serve to extract or suppress information about a particular state using components of the generalized Stokes vector comprises suppression of a dominant, coherent signal at each angle across a span of the multivariate data set by assigning a dominant eigenvector of the spectral matrix as the state vector of interest, $|\psi\rangle$ when treating that spectral matrix.

20. The system of claim 16, wherein constructing filters that serve to extract or suppress information about a particular state using components of the generalized Stokes vector comprises suppression of a dominant, coherent signal at each velocity over an interval of the multivariate data set by assigning a dominant eigenvector of the spectral matrix as the state vector of interest, $|\psi\rangle$ when treating that spectral matrix.

21. The system of claim 16, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center angle band of a particular clutter signal, and applying the fixed state vector to all spectral matrices across an angle band occupied by the clutter signal.

22. The system of claim 16, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center velocity band of a particular clutter signal, and applying the fixed state vector to all spectral matrices across a velocity band occupied by the clutter signal.

23. A computer program product comprised of computer-executable code sections stored on a computer-readable medium, said computer-executable code sections for performing the steps of:
receiving a multivariate data set;
receiving information about a particular signal state, wherein said information is represented by a state vector of interest;
generating a set of orthonormal vectors from the multivariate data set that contains the state vector of interest;
constructing a generalized set of matrices based upon the set of orthonormal vectors, that are trace-orthogonal and which serve as a basis set for expansion of a spectral matrix;
forming a generalized Stokes vector from coefficients of the expansion, wherein the generalized Stokes vector that represents power in the spectral matrix associated with the state vector of interest; and
constructing filters that serve to extract or suppress information about a particular state using components of the generalized Stokes vector.

24. The computer program product of claim 23, wherein constructing filters that serve to extract or suppress information about a particular state using components of the generalized Stokes vector comprises suppression of a dominant, coherent signal at each frequency across a spectrum of the multivariate data set by assigning a dominant eigenvector of the spectral matrix as the state vector of interest, $|\psi\rangle$ when treating that spectral matrix.

25. The computer program product of claim 23, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center frequency band of a particular clutter signal, and applying the fixed state vector to all spectral matrices across a frequency band occupied by the clutter signal.

26. The computer program product of claim 23, wherein constructing filters that serve to extract or suppress information about a particular state using components of the generalized Stokes vector comprises suppression of a dominant, coherent signal at each angle across a span of the multivariate data set by assigning a dominant eigenvector of the spectral matrix as the state vector of interest, $|\psi\rangle$ when treating that spectral matrix.

27. The computer program product of claim 23, wherein constructing filters that serve to extract or suppress information about a particular state using components of the generalized Stokes vector comprises suppression of a dominant, coherent signal at each velocity over an interval of the multivariate data set by assigning a dominant eigenvector of the spectral matrix as the state vector of interest, $|\psi\rangle$ when treating that spectral matrix.

28. The computer program product of claim 23, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center angle band of a particular clutter signal, and applying the fixed state vector to all spectral matrices across an angle band occupied by the clutter signal.

29. The computer program product of claim 23, wherein constructing filters that serve to extract or suppress information about a particular state using components of the generalized Stokes vector comprises suppression of a single clutter signal through use of a single, fixed state vector, derived from a principal eigenvalue of the spectral matrix taken from a center velocity band of a particular clutter signal, and applying the fixed state vector to all spectral matrices across a velocity band occupied by the clutter signal.

* * * * *